US008465612B2

(12) United States Patent
Kumamoto

(10) Patent No.: US 8,465,612 B2
(45) Date of Patent: Jun. 18, 2013

(54) TUBULAR BODY

(75) Inventor: Tomio Kumamoto, Kobe (JP)

(73) Assignee: SRI Sports Limited, Kobe-Shi (JP)

( * ) Notice: Subject to any disclaimer, the term of this patent is extended or adjusted under 35 U.S.C. 154(b) by 363 days.

(21) Appl. No.: 12/890,057

(22) Filed: Sep. 24, 2010

(65) Prior Publication Data

US 2011/0073244 A1 Mar. 31, 2011

(30) Foreign Application Priority Data

Sep. 25, 2009 (JP) ................................. 2009-220511

(51) Int. Cl.
*B32B 37/00* (2006.01)
*B65H 81/00* (2006.01)
(52) U.S. Cl.
USPC ............................ 156/192; 156/189; 156/191
(58) Field of Classification Search
USPC ................. 156/184, 189, 191, 192, 173, 175, 156/169
See application file for complete search history.

(56) References Cited

U.S. PATENT DOCUMENTS

| 4,422,259 | A | * | 12/1983 | Shimano | .................... | 43/18.1 R |
| 5,469,686 | A | * | 11/1995 | Pykiet | ........................ | 52/793.11 |
| 2003/0173460 | A1 | * | 9/2003 | Chapman, Jr. | ................ | 244/123 |

FOREIGN PATENT DOCUMENTS

JP 9-117968 A 5/1997

* cited by examiner

*Primary Examiner* — Jeff Aftergut
(74) *Attorney, Agent, or Firm* — Birch, Stewart, Kolasch & Birch, LLP

(57) ABSTRACT

In this manufacturing method, a tubular body 18 having a rib 16 provided therein is obtained. The manufacturing method includes the steps of: preparing a mandrel 2 divided into two or more divided bodies d1 along a longitudinal direction of the mandrel 2; winding a prepreg r1 for a rib around at least one of the divided bodies d1; combining all the divided bodies d1 to obtain a first intermediate body 10 after the step of winding the prepreg r1 for the rib; winding a prepreg g1 for the outer peripheral part around an outside of the first intermediate body 10 to obtain a second intermediate body; heating the second intermediate body to obtain a cured laminate; and extracting the mandrel 2 from the cured laminate. Preferably, the mandrel is equally divided in a circumferential direction. Preferably, a winding start end part t2 of the prepreg r1 for the rib and a winding finish end part t1 thereof overlap with each other.

10 Claims, 23 Drawing Sheets

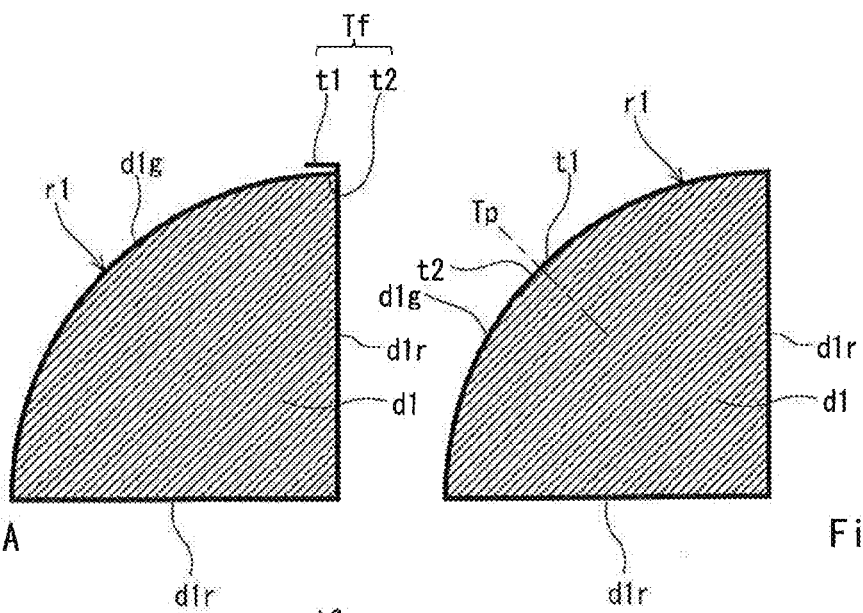
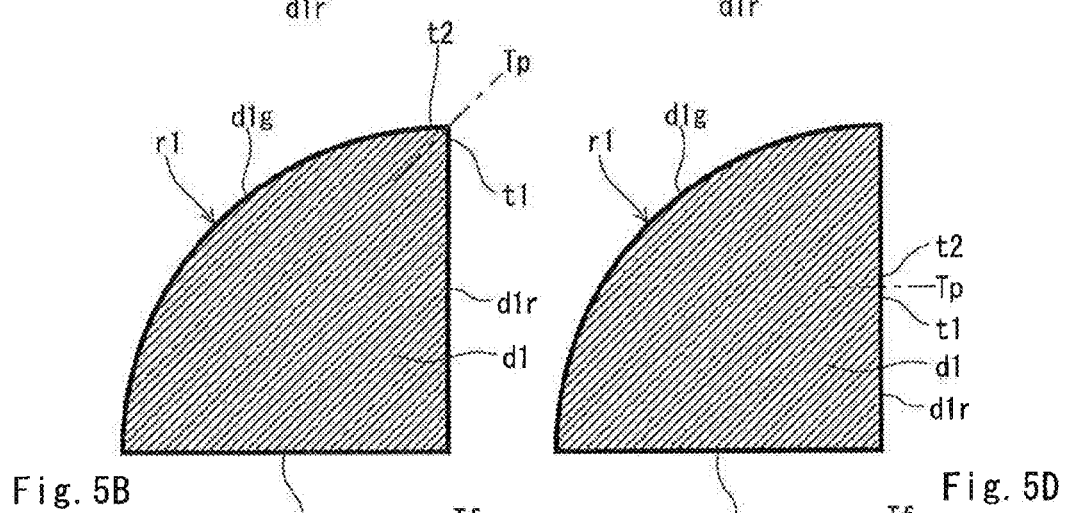
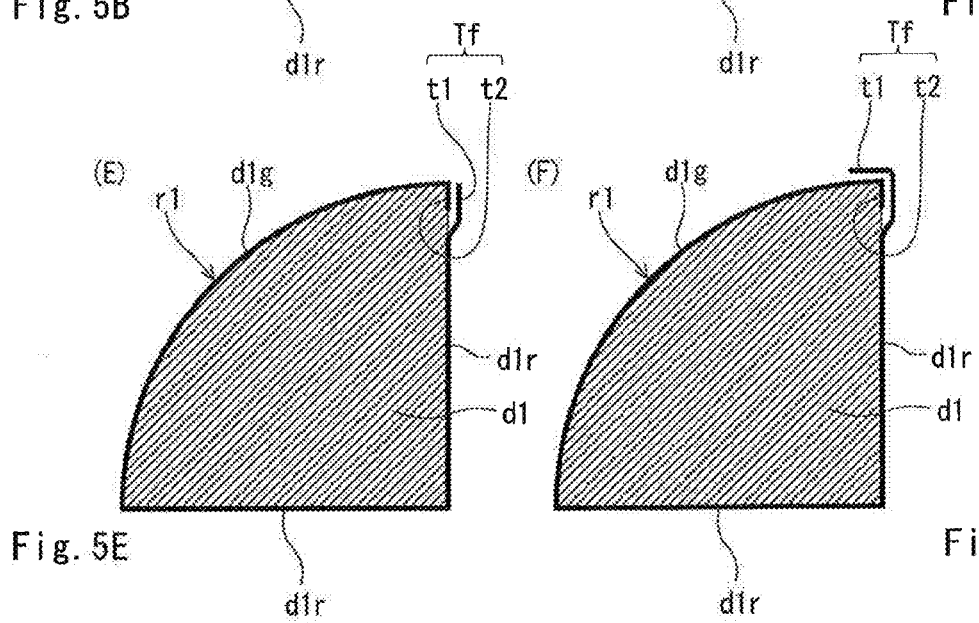
Fig. 5A  Fig. 5C
Fig. 5B  Fig. 5D
Fig. 5E  Fig. 5F (Example 1)

(Example 2)

e21(r1)

e22(r1)

e23(r1)

e24(r1)

e25(g1)
e26(g1)

e27(g1)

e28(g1)

(Example 3)

(Example 4)

(Example 5)

(Example 6)

(Example 7)

e71(r1)

e72(r1)

e73(r1)

e74(r1)

e75(g1)
e76(g1)

e77(g1)

e78(g1)

(Example 8)

90° e81(r1)

90° e82(r1)

90° e83(r1)

90° e84(r1)

±45° e85(g1) e86(g1)

0° e87(g1)

0° e88(g1)

(Example 10)

(Example 11)

c11(r1) 90° c12(r1) 90° c13(r1) 90° c14(r1) 90° c15(g1) / c16(g1) ±45° c17(g1) 0° c18(g1) 0°

(Example 12)

c21(r1)

c22(r1)

c23(r1)

c24(r1)

c25(g1) / c26(g1)

c27(g1)

c28(g1)

(Example 13)

TUBULAR BODY

The present application claims priority on Patent Application No. 2009-220511 filed in JAPAN on Sep. 25, 2009, the entire contents of which are hereby incorporated by reference.

BACKGROUND OF THE INVENTION

1. Field of the Invention

The present invention relates to a tubular body such as a golf club shaft.

2. Description of the Related Art

A tubular body has various applications. Since the tubular body has a cavity formed therein, the tubular body is lightweight and has high rigidity. The tubular body which is lighter in weight and has excellent rigidity and strength can be useful for various applications.

An example of the applications for the tubular body is a golf club shaft. A golf club shaft using a carbon fiber is available. This type of shaft is also referred to as a carbon shaft. A carbon shaft which is lightweight and has high strength can be manufactured by using the carbon fiber.

The lightweight shaft contributes to enhancement in head speed. In respect of the head speed, a shaft which is lighter in weight is preferable. The lightweight tubular body is effective in many fields.

On the other hand, weight reduction causes reduction in strength. In addition, the weight reduction is apt to cause excessive reduction in rigidity of a shaft. In many fields, the tubular shaft which is lightweight and has high strength is worth.

Japanese Patent Application Laid-Open No. 9-117968 discloses a golf club shaft having a hollow part having a rib-like reinforcing part. This structure maybe useful for a shaft which is lightweight while maintaining strength and rigidity.

SUMMARY OF THE INVENTION

In a manufacturing method described in Japanese Patent Application Laid-Open No. 9-117968, a mandrel divided in an axial direction thereof is used (see FIG. 2 in Japanese Patent Application Laid-Open No. 9-117968). In the manufacturing method described in this official gazette, a prepreg is inserted into a gap part of the divided mandrel (see Paragraph [0016] in Japanese Patent Application Laid-Open No. 9-117968). In the case of this manufacturing method, a position where the prepreg is disposed may be varied in a process in which the prepreg is inserted. "A portion projected from the gap part" is shown in FIG. 4 of the official gazette. In this shaft, "the projected portion" is short, and only this short projected portion is joined to an outer prepreg. Therefore, a joined portion of the prepreg disposed in the gap part and the outer circumferential prepreg is few. When variation in a length of this "projected portion" is generated, this joined portion may be further decreased. Therefore, in the shaft described in Japanese Patent Application Laid-Open No. 9-117968, the joint strength of the tube body and the reinforcing part is apt to be low.

The present inventor invented a manufacturing method of a tubular body which can be lightweight and can have high strength based on new technical idea.

It is an object of the present invention to provide a manufacturing method of a tubular body which is lightweight and can have high strength.

The present invention is a manufacturing method of a tubular body having a rib provided therein. This manufacturing method includes the steps of: preparing a mandrel divided into two or more divided bodies along a longitudinal direction of the mandrel; winding a prepreg for a rib around at least one of the divided bodies; combining all the divided bodies to obtain a first intermediate body after the step of winding the prepreg for the rib; winding a prepreg for an outer peripheral part around an outside of the first intermediate body to obtain a second intermediate body; heating the second intermediate body to obtain a cured laminate; and extracting the mandrel from the cured laminate.

Preferably, the mandrel is equally divided in a circumferential direction. Preferably, a division number of the mandrel is even. The divided body around which the prepreg for the rib is wound, and the divided body around which the prepreg for the rib is not wound may be alternately disposed in the circumferential direction in the mandrel of the combined state. Alternatively, the prepreg for the rib may be wound around all the divided bodies.

A longitudinal length of the prepreg for the rib may be made shorter than a full length of the tubular body. The prepreg for the rib may be wound around a portion of a length of the divided body. The rib may be disposed on a portion of a length of the tubular body. A longitudinal position of the rib may be adjusted based on a winding position of the prepreg for the rib in the divided body.

A winding start end part of the prepreg for the rib and a winding finish end part thereof may overlap with each other.

The tubular body having the rib provided therein can be efficiently manufactured. The tubular body which is lightweight and has high strength can be obtained.

BRIEF DESCRIPTION OF THE DRAWINGS

FIG. 5 is a view for explaining a winding finish end part t1 and a winding start end part t2;

DESCRIPTION OF THE PREFERRED EMBODIMENTS

Hereinafter, the present invent ion will be described below in detail based on preferred embodiments with reference to the drawings. Hereinafter, description will be given to a golf club shaft as an example. However, the present invention is also applied to tubular bodies other than the golf club shaft. Hereinafter, the term "shaft" can be unexceptionally replaced by the term "tubular body".

In the present application, the term "longitudinal direction" is a longitudinal direction of the shaft, and is also a longitudinal direction of a divided body. In the present application, the term "circumferential direction" is a circumferential direction of the shaft, and is also a circumferential direction of a mandrel in a combined state. The term "circumferential direction" is also a circumferential direction of a first intermediate body in a combined state.

Figure 1:
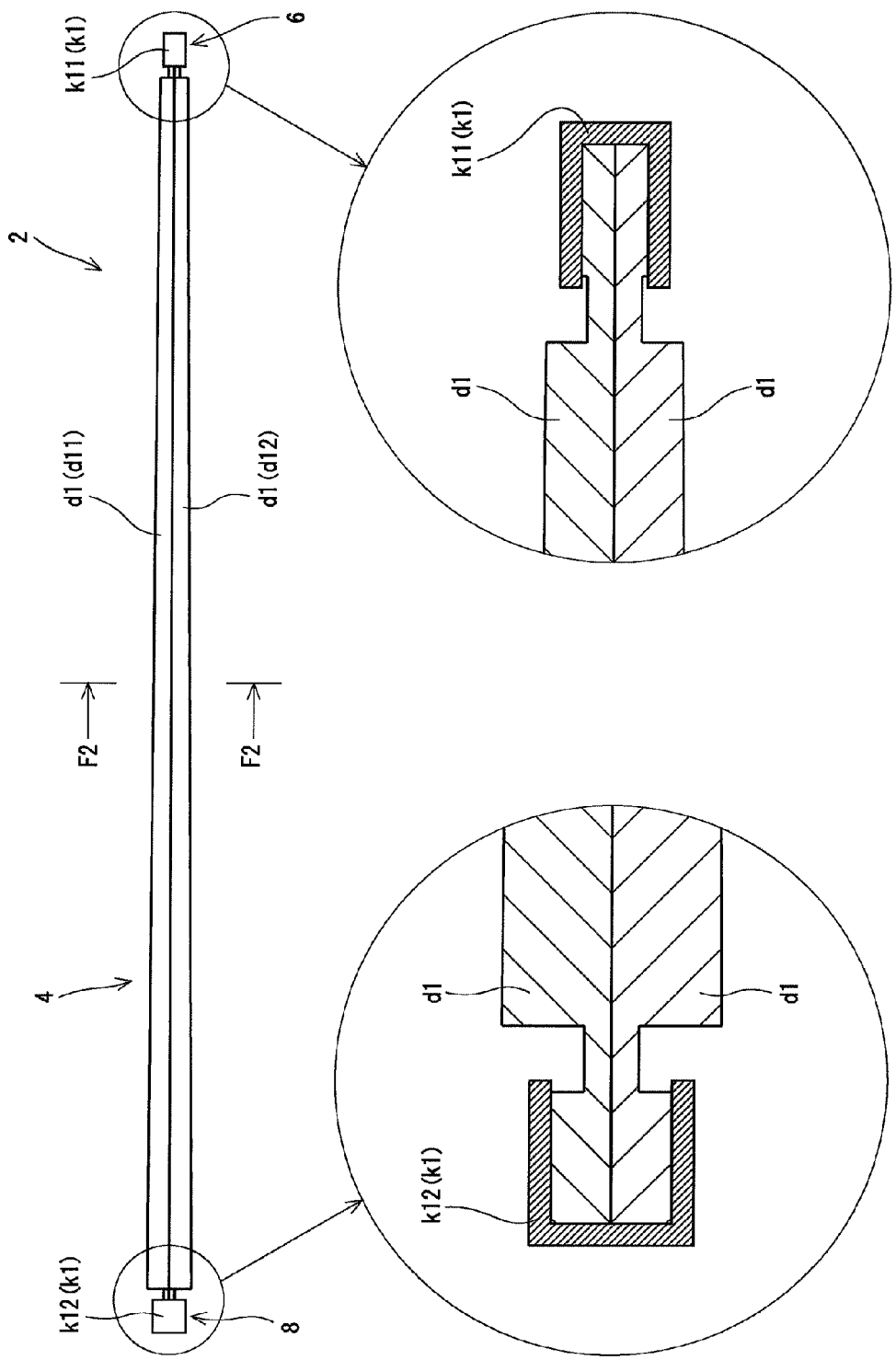
FIG. 1 is an overall view of a mandrel used for a manufacturing method according to a first embodiment of the present invention.
Figure 2:
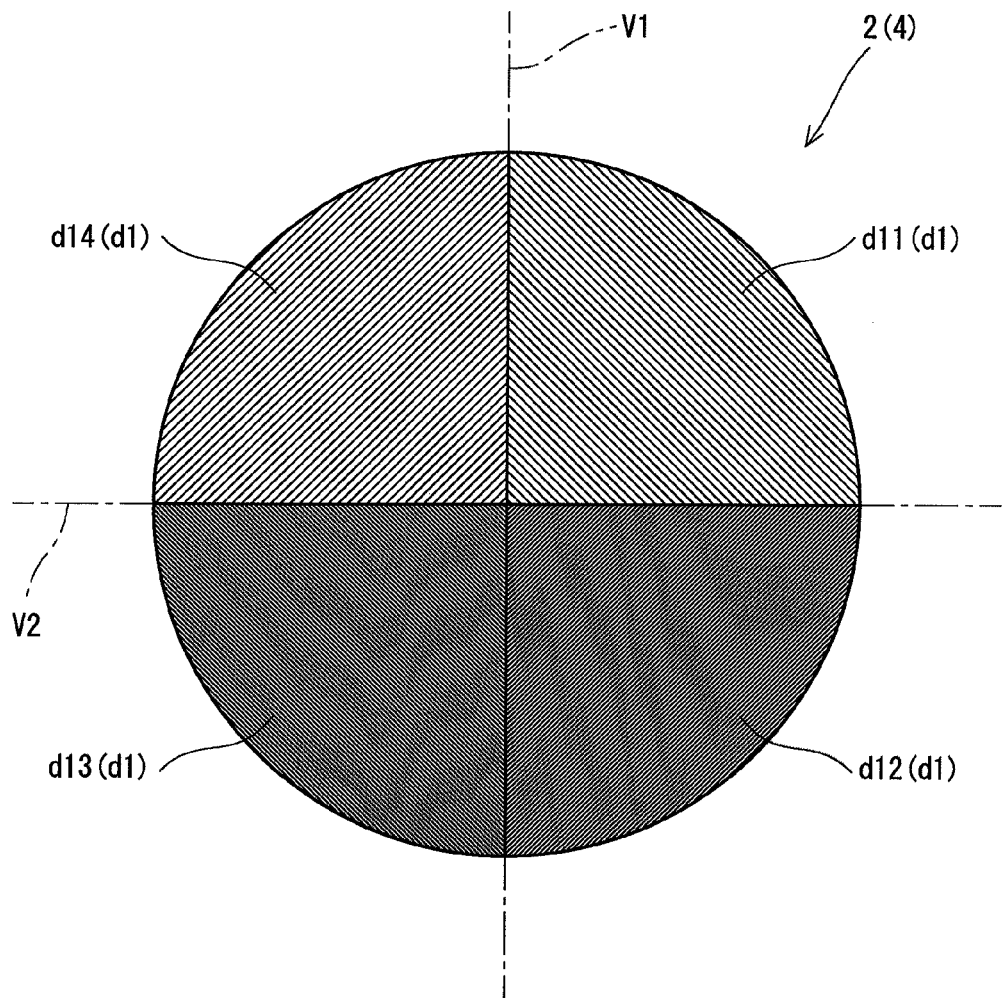
FIG. 2 is a cross sectional view taken along the line F2-F2 of FIG. 1.
Figure 3:
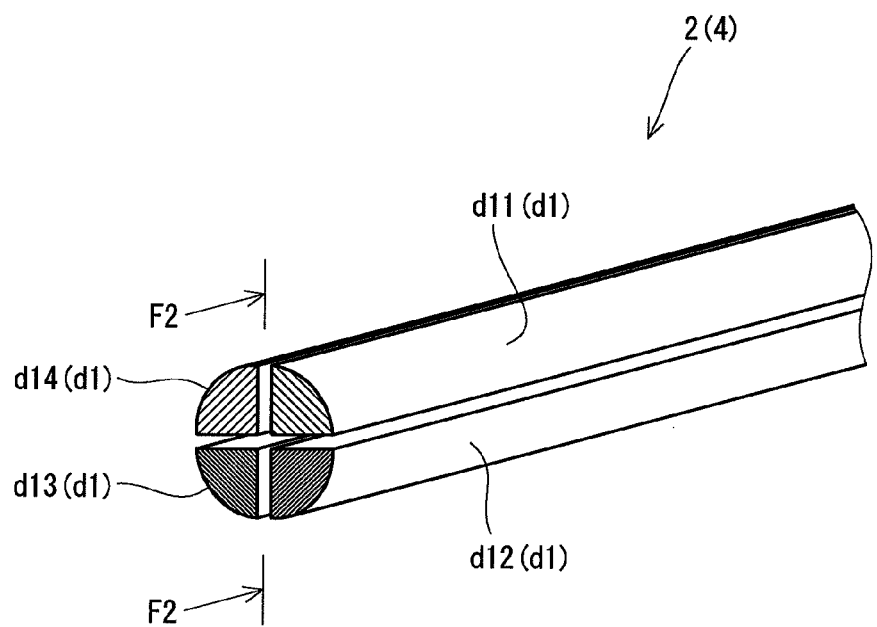
FIG. 3 is a perspective view of the mandrel cut along the line F2-F2 of FIG. 1.

FIG. 1 is an overall view of a mandrel 2 used for a manufacturing method of a tubular body according to a first embodiment of the present invention. The tubular body of this embodiment is a golf club shaft. FIG. 2 is a cross sectional view taken along the line F2-F2 of FIG. 1. FIG. 3 is a perspective view of the mandrel 2 cut along the line F2-F2 of FIG. 1.

The mandrel 2 is divided along a longitudinal direction. The mandrel 2 is divided into a plurality. The mandrel 2 is divided along a full length thereof. The mandrel 2 is equally divided in a circumferential direction. The mandrel 2 is divided into four in the circumferential direction (see FIGS. 2 and 3). The mandrel 2 may be unequally divided in the circumferential direction.

The material of the mandrel 2 is not limited. The material of the mandrel 2 is typically steel.

The mandrel 2 has two divided planes V1 and V2 (see FIG. 2). The divided planes V1 and V2 of the mandrel 2 include a central axis line of the mandrel 2. The divided plane V1 and the divided plane V2 are perpendicular to each other. A crossing line of the divided plane V1 and the divided plane V2 is the central axis line of the mandrel 2.

The mandrel 2 has a plurality of divided bodies. The number of the divided bodies is equal to a division number. The mandrel 2 of the embodiment has four divided bodies d1. The four divided bodies d1 are entirely the same. Hereinafter, for convenience of explanation, the upper right divided body d1 of FIG. 2 is defined as a first divided body d11. The lower right divided body d1 of FIG. 2 is defined as a second divided body d12. The lower left divided body d1 of FIG. 2 is defined as a third divided body d13. The upper left divided body d1 of FIG. 2 is defined as a fourth divided body d14.

The divided bodies d1 can be separated. A state where the four divided bodies d1 are separated is shown in FIG. 3. On the other hand, all the divided bodies d1 are combined in FIGS. 1 and 2. In the present application, a state where all the divided bodies d1 are combined is also referred to as a combined state. Examples of the combined state include a combined state A where a prepreg r1 for a rib is unwound, and a combined state B where the prepreg r1 for the rib is wound. Both the combined state A and the combined state B are merely referred to as the combined state in the present application. A holding member k1 which can hold the combined state is shown in FIG. 1. In the embodiment of FIG. 1, a tip end holding member k11 and a butt end holding member k12 are used. The tip end holding member k11 is a cap. The butt end holding member k12 is a cap. The plurality of divided bodies d1 is bundled by the tip end holding member k11 and the butt end holding member k12. The tip end holding member k11 and the butt end holding member k12 are attachable and detachable. The combined state is maintained by bundling the divided bodies d1 and mounting the holding member k1. The holding member k1 is preferably provided at a position where a prepreg is not wound. In the embodiment of FIG. 1, the holding members k1 are provided on a tip end part where the prepreg is not wound and a butt end part where the prepreg is not wound.

The mandrel 2 of the combined state has a main body part 4, a tip end part 6 and a butt end part 8 (see FIG. 1). The main body part 4 is a portion around which the prepreg is wound. The tip end part 6 is a portion to which the tip end holding member k11 is mounted. The butt end part 8 is a portion to which the butt end holding member k12 is mounted.

In the combined state, the sectional shape of the main body part 4 is circular (see FIG. 2). An outer diameter D1 of the mandrel 2 of the combined state is smaller toward the tip end side (see FIG. 1). The mandrel 2 may have the position of which the outer diameter D1 is uniform. The outer diameter D1 may be fixed along the full length.

The material of the holding member k1 is not limited. Examples of the material of the holding member k1 include a metal and a resin. In the manufacturing method of the embodiment, the combined state is held with the prepreg sandwiched between the divided bodies d1, which will be described below. The outer diameter of the mandrel 2 of the combined state A is different from that of the combined state B. In respect of being suitable for the manufacturing method of the present invention, the holding member k1 which can maintain the combined state B is preferable. In respects of workability and convenience, the holding member k1 which can maintain the combined state A and the combined state B is more preferable.

Figure 4:
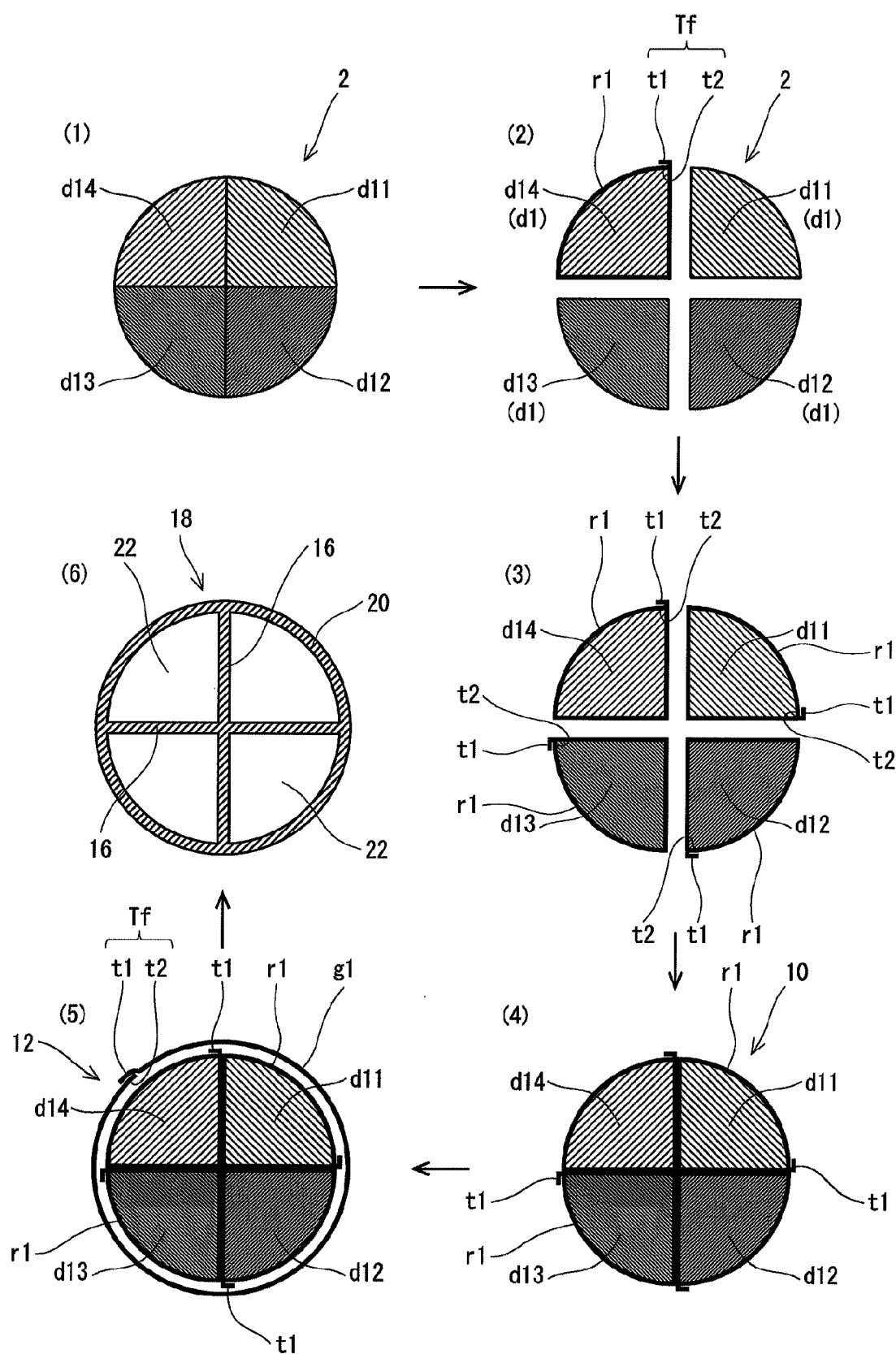
FIG. 4 is a view for explaining the manufacturing method of the first embodiment of the present invention.

FIG. 4 is a view for explaining the manufacturing method of the shaft according to the embodiment. The manufacturing method of the embodiment will be described with reference to FIG. 4.

In the cross sectional views of the present application including FIG. 4, the section of the prepreg is shown by a thick line (a thick solid line).

(1) Cutting Process

A prepreg sheet is cut into a desired shape in the cutting process. The cutting may be performed by a cutting machine, or may be manually performed using a cutter knife or the like. The prepreg r1 for the rib wound around the divided body d1 and a prepreg g1 for an outer peripheral part wound around the outside of the mandrel of the combined state are obtained by the cutting process. The prepreg r1 for the rib and the prepreg g1 for the outer peripheral part will be described in detail below. In the present application, the cut prepreg is also referred to as a sheet.

A portion of the prepreg r1 for the rib forms a rib. The other portion of the prepreg r1 for the rib forms the outer peripheral part of the shaft.

The prepreg r1 for the rib may be a full length prepreg, or may be a partial prepreg. The full length prepreg and the partial prepreg may be used in combination as the prepreg r1 for the rib.

The full length prepreg is provided over the entire axial direction of the shaft. The partial prepreg is provided on a portion in the axial direction of the shaft.

The prepreg g1 for the outer peripheral part usually includes a prepreg for a bias layer and a prepreg for a straight layer. The prepreg g1 for the outer peripheral part may be a prepreg for a hoop layer. The prepreg g1 for the outer peripheral part may be a full length prepreg, or may be a partial prepreg. The full length prepreg and the partial prepreg may be used in combination as the prepreg g1 for the outer peripheral part.

The prepreg g1 for the outer peripheral part forms only the outer peripheral part of the shaft. The prepreg g1 for the outer peripheral part does not form the rib.

(2) Laminating Process

A prepreg sheet which is hard to independently wind is laminated on other sheet in the laminating process. The laminating process is performed if needed. In the laminating process, for example, the prepregs for the bias layer are laminated together. The laminating process is usually performed after the cutting process. The prepregs g1 for the outer peripheral part may be laminated together. The prepregs r1 for the rib may be laminated together.

Typical example laminated in the laminating process is the prepreg for the bias layer, which will be described below. The prepregs r1 for the rib may be laminated together. This example will be shown in example which will be described below.

(3) First Winding Process

The divided mandrel 2 is used in the first winding process. In this process, the prepreg r1 for the rib is wound around at least one divided body d1.

The prepreg r1 for the rib maybe wound around only a portion of the plurality of divided bodies d1, or may be wound around all the divided bodies d1. FIG. 4(3) shows a state where the prepreg r1 for the rib is wound around all the divided bodies d1.

In FIGS. 4(2) and (3), the prepreg r1 for the rib is wound around the divided body d1 approximately once. That is, the winding number of the prepreg r1 for the rib to the divided body d1 is about 1. More properly, the winding number of the prepreg r1 for the rib to the divided body d1 is greater than 1. A winding finish end part t1 of the prepreg r1 for the rib overlaps with a winding start end part t2 thereof due to the winding number being greater than 1 (see FIG. 4). The winding finish end part t1 and the winding start end part t2 overlap with each other to form an overlapping part.

For purposes of clarity of understanding in FIG. 4 or the like, a clearance is provided between the end part t1 and the end part t2. However, in fact, the end part t1 and the end part t2 overlap with each other with no clearance. For purposes of clarity of understanding in FIG. 4 or the like, the end part t1 is linearly drawn. However, in fact, the end part t1 overlaps with the outside of the end part t2 along the end part t2.

The overlapping of the end part t1 and the end part t2 forms the overlapping part in which the same prepregs r1 for the rib overlap with each other. This overlapping part can contribute to enhancement in strength. Even when the winding number is greater than 1 in design dimensions, the winding number may be less than 1 due to a winding error and a dimension error or the like. When the winding number is less than 1, a clearance is generated between the winding start end part and the winding finish end part. This clearance may reduce strength. The generation of the clearance is suppressed by providing the overlapping part. In this respect, the winding number of the prepreg r1 for the rib to the divided body d1 is preferably greater than 1.00.

The winding process may be performed by a manual operation or a machine referred to as a rolling machine or the like.

(4) Combining Process

This process is performed after the first winding process. As shown in FIG. 4(4), in the process, all the divided bodies d1 are combined to obtain a first intermediate body 10. The four divided bodies d1 are bundled, and the tip end holding member k11 and the butt end holding member k12 are mounted to the bundled divided bodies d1 to obtain the first intermediate body 10. This first intermediate body 10 is in the combined state B.

(5) Second Winding Process

In the second winding process, the prepreg g1 for the outer peripheral part is wound around the outside of the first intermediate body 10 to obtain a second intermediate body 12. In FIG. 4(5), the prepreg g1 for the outer peripheral part is separated from the first intermediate body 10. However, in fact, both the prepreg g1 for the outer peripheral part and the first intermediate body 10 are overlapped with no clearance.

As shown in FIG. 4(5), the winding number of the prepreg g1 for the outer peripheral part is equal to or greater than 1.00. Due to the winding number of equal to or greater than 1.00, the prepreg g1 for the outer peripheral part has an overlapping part Tf. This overlapping part Tf contributes to enhancement in strength.

The second winding process may be performed by a manual operation or a machine referred to as a rolling machine or the like.

(6) Tape Wrapping Process

A tape is wrapped around the outer peripheral surface of the second intermediate body 12 in the tape wrapping process. This tape is also referred to as a wrapping tape. This wrapping tape is wrapped while tension is applied to the wrapping tape.

(7) Curing Process

In the curing process, the second intermediate body 12 after performing the tape wrapping is heated. This heating cures a matrix resin. In this curing process, the matrix resin fluidizes temporarily. This fluidization of the matrix resin can discharge air between the sheets or in the sheet. The tension (clamp pressure force) of the wrapping tape accelerates this discharge of the air. This curing provides a cured laminate (abbreviated in the drawing).

(8) Process of Extracting Mandrel and Process of Removing Wrapping Tape

The process of extracting the mandrel 2 and the process of removing the wrapping tape are performed. The order of both the processes is not limited. However, in respect of enhancing the efficiency of the process of removing the wrapping tape, the process of removing the wrapping tape is preferably performed after the process of extracting the mandrel 2.

In the extraction of the mandrel 2, the plurality of divided bodies d1 may be simultaneously extracted, and the plurality of divided bodies d1 may be sequentially extracted.

As shown in FIG. 4(6), the mandrel 2 is extracted to obtain a shaft (cured tubular body) 18 having a rib 16 provided therein. This shaft 18 has an outer peripheral part 20 and the rib 16. Cavities 22 are formed in portions in which the divided bodies d1 has existed. The shape of the cavity 22 corresponds to the shape of the divided body d1. A hollow part of the shaft is divided by the rib 16. The number of the cavities 22 formed by the division of the rib 16 is equal to the division number of the mandrel 2.

As can be understood from the manufacturing process, the outer peripheral part 20 is formed by the prepreg r1 for the rib and the prepreg g1 for the outer peripheral part. The contact area of the prepreg r1 for the rib with the prepreg g1 for the outer peripheral part is large. The bonding strength of the prepreg r1 for the rib and the prepreg g1 for the outer peripheral part is high.

On the other hand, the rib 16 is formed by only the prepreg r1 for the rib. In the embodiment, the prepreg r1 for the rib constituting the rib 16 is also in wide contact with the prepreg g1 for the outer peripheral part. Therefore, the joint strength of the rib 16 and the outer peripheral part 20 is high. The shaft 18 has excellent strength.

The prepreg r1 for the rib wound around the divided body d1 (for example, the first divided body d11) and the prepreg r1 for the rib wound around the divided body d1 (for example, the second divided body d12) adjacent to the divided body d1 overlap with each other to form the rib 16. The contact area of the prepregs r1 for the rib is large. This can contribute to enhancement in strength.

In the embodiment, the thickness of the rib 16 is substantially fixed. That is, the thickness of the rib 16 is twice that of the prepreg r1 for the rib. A shaft having less variation in the thickness in the circumferential direction can be obtained by the fixed thickness of the prepreg r1 for the rib.

The variation in the thickness due to the overlapping part or the like is not reflected in FIG. 4(6). FIG. 4(6) is only a schematic cross sectional view for showing the rib 16 and the outer peripheral part 20.

(9) Process of Cutting Both Ends

The both end parts of the cured laminate 18 are cut in the process. This cutting flattens the tip end surface and the butt end surface of the shaft.

(10) Polishing Process

The surface of the cured laminate is polished in this process. This polishing is also referred to as surface polishing. Spiral unevenness left behind as the trace of the wrapping tape exists on the surface of the cured laminate. The polishing extinguishes the unevenness as the trace of the wrapping tape to flatten the surface.

(11) Coating Process

The cured laminate after the polishing process is subjected to coating.

The shaft 18 obtained via these processes is a so-called carbon shaft. The prepreg (the prepreg r1 for the rib and the prepreg g1 for the outer peripheral part) has a fiber and a matrix resin. Typically, this fiber is a carbon fiber. Typically, this matrix resin is a thermosetting resin.

The number of the sheets is not limited. The number of the prepregs r1 for the rib is not limited. The number of the prepregs g1 for the outer peripheral part is not limited. The arrangement of each of the sheets, the shape of each of the sheets, and the fiber used in each of the sheets, or the like are not limited. The orientation angle or the like of the fiber in each of the sheets is not limited.

FIG. 5 is a view for explaining the winding finish end part t1 and the winding start end part t2 of the prepreg r1 for the rib. FIGS. 5A, 5E and 5F show cases where the prepreg r1 for the rib has the overlapping part in which the winding finish end part t1 and the winding start end part t2 overlap with each other. On the other hand, FIGS. 5B, 5C and 5D show a case where the prepreg r1 for the rib has no overlapping part.

In FIG. 5B, the winding finish end part t1 and the winding start end part t2 are butted to each other. In this embodiment, the winding number is 1.00. The embodiment is ideal in that the thickness is fixed. In this respect, the winding finish end part t1 and the winding start end part t2 are preferably butted to each other. However, the winding finish end part t1 and the winding start end part t2 may not be butted to each other due to the winding error or the like. In this case, a clearance is generated between the winding finish end part t1 and the winding start end part t2. This clearance may generate voids. The voids may reduce the strength of the shaft. In respect of strength, the winding number of the prepreg r1 for the rib to the divided body d1 is preferably greater than 1.00. That is, in respect of strength, the prepreg r1 for the rib wound around the divided body d1 preferably has the overlapping part Tf. The overlapping part Tf is a portion in which the winding finish end part t1 and the winding start end part t2 overlap with each other.

Embodiments in which the winding finish end part t1 and the winding start end part t2 are butted to each other are shown in FIGS. 5B, 5C and 5D. In the embodiment of FIG. 5B, a butting position Tp is located at a boundary between a rib surface d1r of the divided body d1 and an outer surface d1g of the divided body d1. In the embodiment of FIG. 5C, the butting position Tp is located on the outer surface d1g. In the embodiment of FIG. 5D, the butting position Tp is located on the rib surface d1r.

As in the embodiment of FIG. 5D, when the butting position Tp is located on the rib surface d1r, the strength of the rib is apt to be reduced. In this respect, the butting position Tp is preferably located on the outer surface d1g.

When the prepreg r1 for the rib has the overlapping part Tf in which the winding finish end part t1 and the winding start end part t2 overlap with each other as shown in FIGS. 5A, 5E and 5F, the winding finish end part t1 and the winding start end part t2 are joined by the overlapping part Tf. The position of the overlapping part Tf may be the outer surface d1g, or may be the rib surface d1r. When the strength of the rib is prioritized, the overlapping part Tf is preferably located on the outer surface d1g. On the other hand, when the symmetry and homogeneity of the physicality of the shaft are prioritized, the overlapping part Tf is preferably located on the rib surface d1r.

In respects of the symmetry and strength of the physicality of the shaft, when the overlapping parts Tf are located on the outer surface d1g, the overlapping parts Tf are preferably disposed at substantially equal intervals in the circumferential direction. In the embodiment of FIG. 4(4), the overlapping parts Tf are disposed at equal intervals (for every 90 degrees) in the circumferential direction.

The overlapping part Tf is preferably located at a boundary between the outer surface d1g and the rib surface d1r (see FIGS. 5A, 5E and 5F). In this case, since the overlapping part Tf is disposed at the root of the rib, the strength can be enhanced. The embodiments in which the overlapping part Tf is located at the boundary between the outer surface d1g and the rib surface d1r include the embodiments shown in FIGS. 5A, 5E and 5F. The embodiment shown in FIG. 5A can uniform the thickness of the rib. The embodiment shown in FIG. 5A contributes to enhance productivity. The embodiments shown in FIGS. 5E and 5F can enhance the strength of the root of the rib.

Figure 6A:
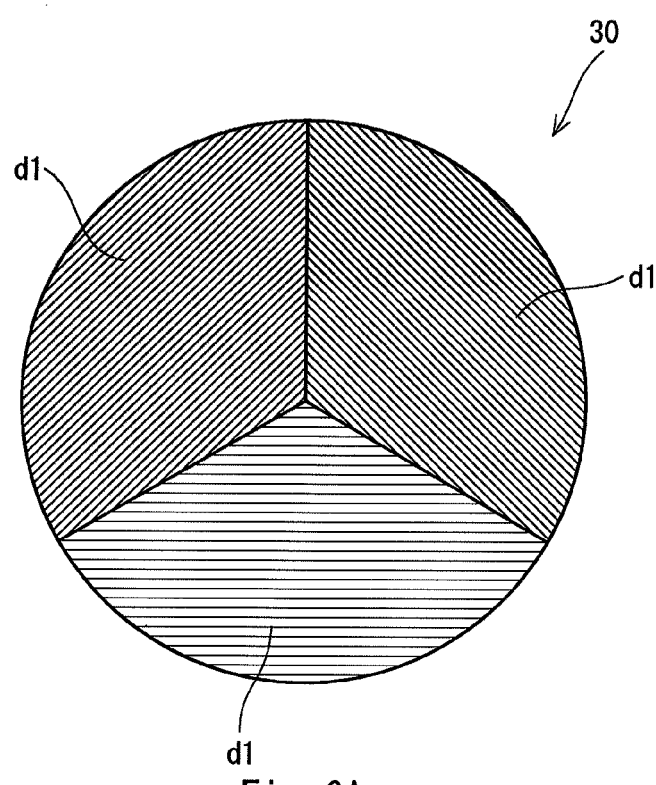
FIG. 6A is a cross sectional view of a mandrel used for a manufacturing method of a second embodiment.
Figure 6B:
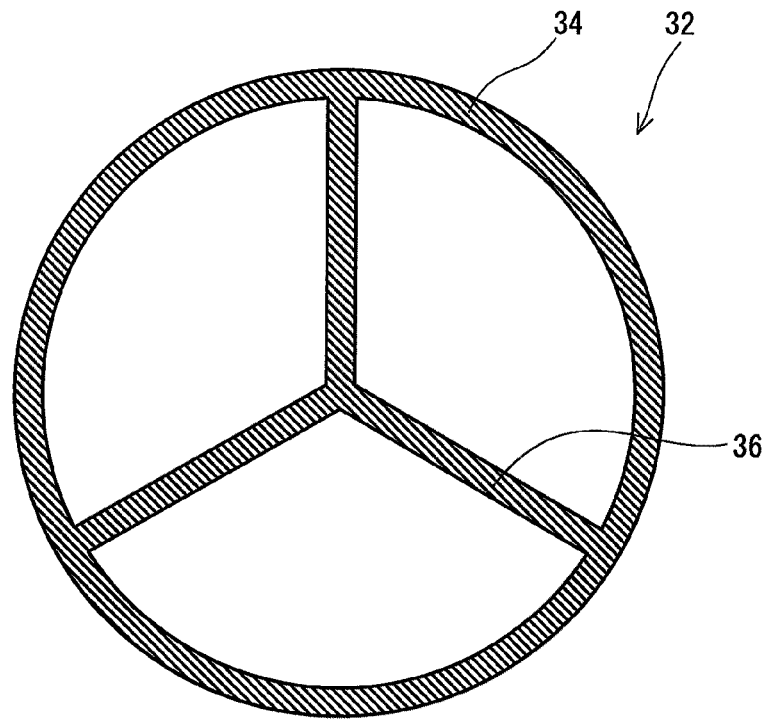
FIG. 6B is a cross sectional view of a shaft obtained by the manufacturing method of the second embodiment.

FIG. 6A is a cross sectional view of a mandrel 30 according to a manufacturing method of a second embodiment. FIG. 6B is a cross sectional view of a shaft 32 according to the manufacturing method of the second embodiment. The shaft 32 can be obtained by using this mandrel 30 in place of the mandrel 2.

In this second embodiment, the mandrel 30 is divided into three divided bodies d1. The mandrel 30 is equally divided in a circumferential direction. The shaft 32 is obtained by using the mandrel 30. The shaft 32 has an outer peripheral part 34 and a rib 36. The rib 36 corresponding to the three divided bodies d1 is formed.

FIG. 7 shows a first intermediate body according to the manufacturing method of the second embodiment. In order to facilitate understanding of FIG. 7, a clearance is provided between adjacent prepregs r1 for the rib. This clearance does not exist in the actual first intermediate body. The section of the prepreg r1 for the rib is shown by a thick line.

Figure 7A:
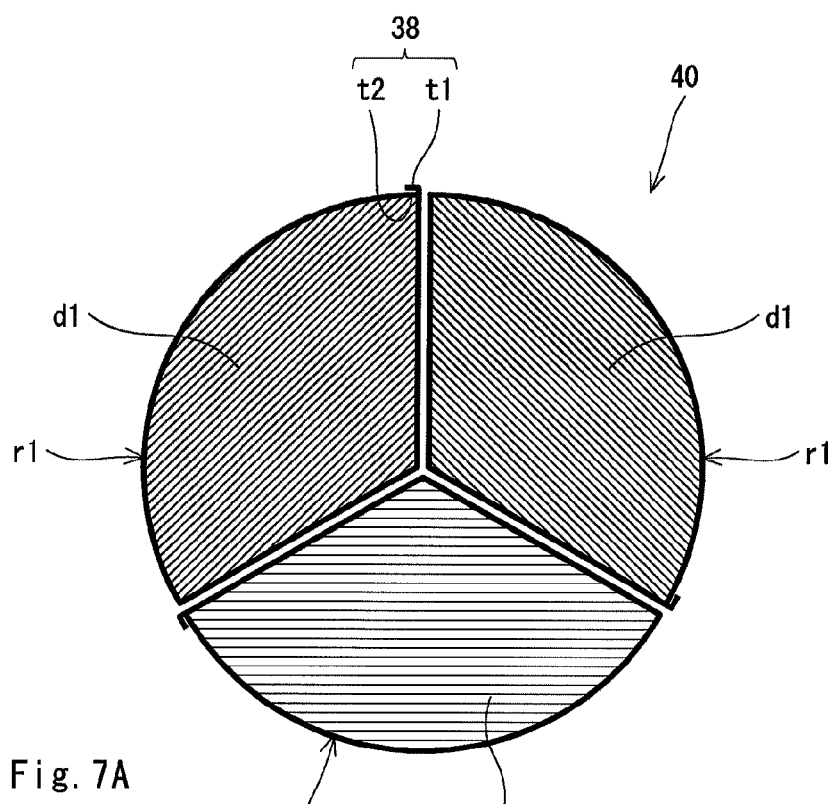
FIG. 7 is a view for explaining the manufacturing method of the second embodiment.
Figure 7B:
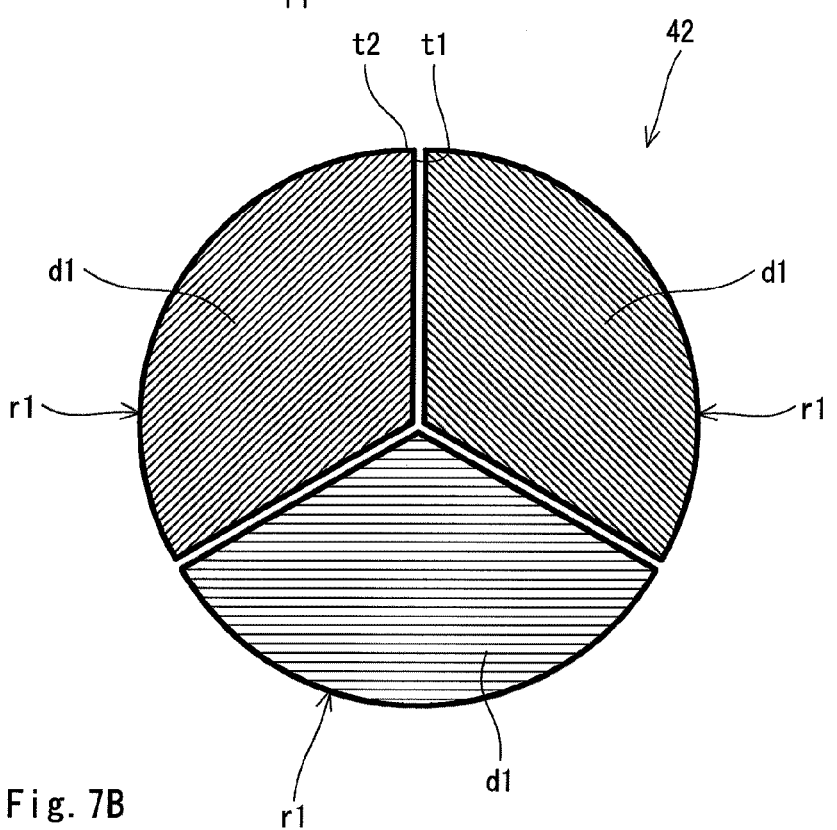

FIG. 7A shows a first intermediate body 40 when the first intermediate body 40 has an overlapping part 38. In each of the prepregs r1 for the rib, a winding finish end part t1 and a winding start end part t2 overlap with each other. FIG. 7B shows a first intermediate body 42 when the first intermediate body 42 has no overlapping part. In the first intermediate body 42, the winding finish end part t1 and the winding start end part t2 are butted to each other.

Figure 8A:
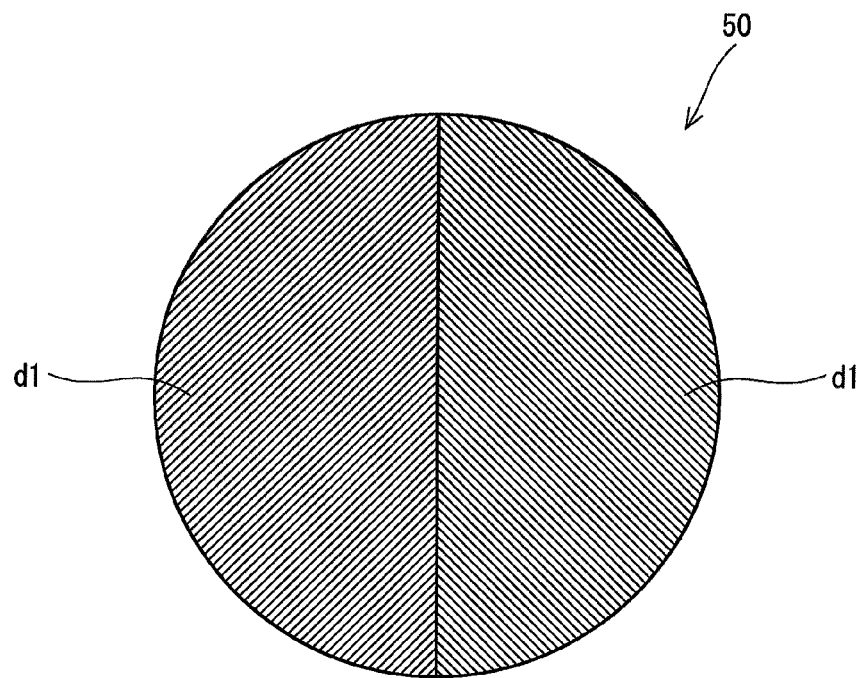
FIG. 8A is a cross sectional view of a mandrel used for a manufacturing method of a third embodiment.
Figure 8B:
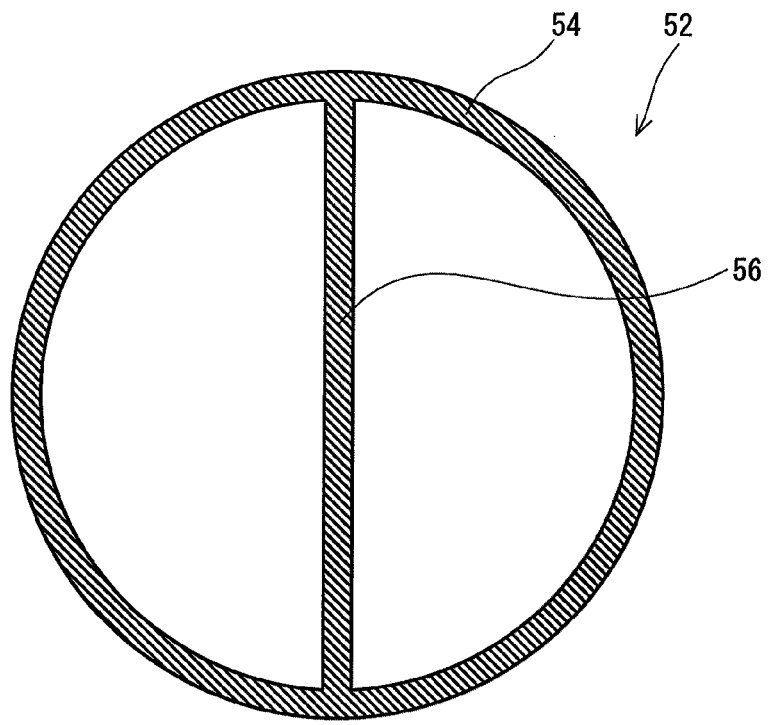
FIG. 8B is a cross sectional view of a shaft obtained by the manufacturing method of the third embodiment.

FIG. 8A is a cross sectional view of a mandrel 50 according to a manufacturing method of a third embodiment. FIG. 8B is a cross sectional view of a shaft 52 according to the manufacturing method of the third embodiment. The shaft 52 can be obtained by using this mandrel 50 in place of the mandrel 2.

In this third embodiment, the mandrel 50 is divided into two divided bodies d1. The mandrel 50 is equally divided in a circumferential direction. The shaft 52 is obtained by using the mandrel 50. The shaft 52 has an outer peripheral part 54 and a rib 56. The rib 56 corresponding to the two divided bodies d1 is formed.

FIG. 9 shows a first intermediate body according to the manufacturing method of the third embodiment. In order to facilitate understanding of FIG. 9, a clearance is provided between adjacent prepregs r1 for the rib. This clearance does not exist in the actual first intermediate body. The section of the prepreg r1 for the rib is shown by a thick line.

Figure 9A:
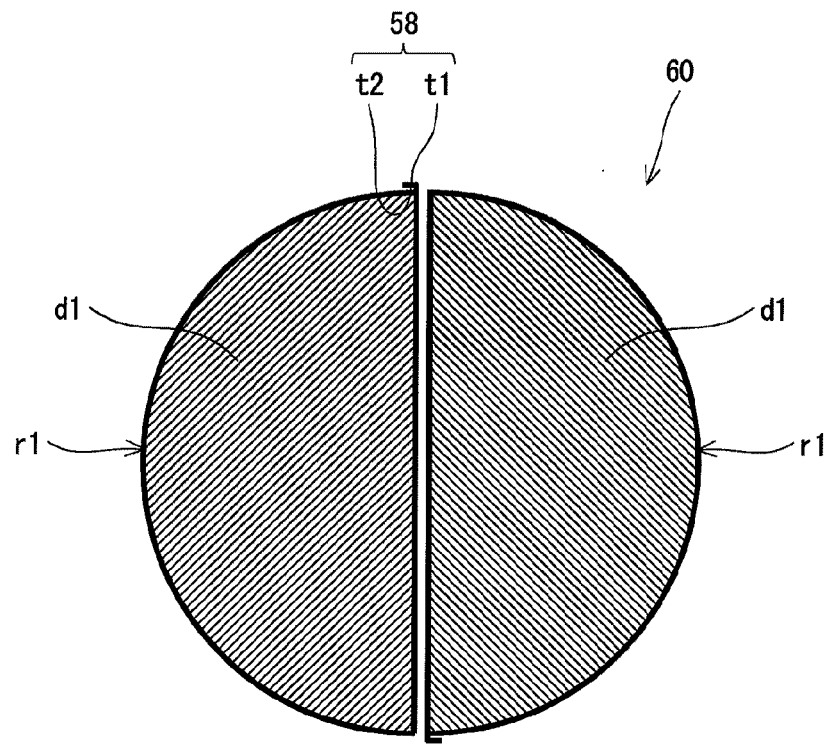
FIG. 9 is a view for explaining the manufacturing method of the third embodiment.
Figure 9B:
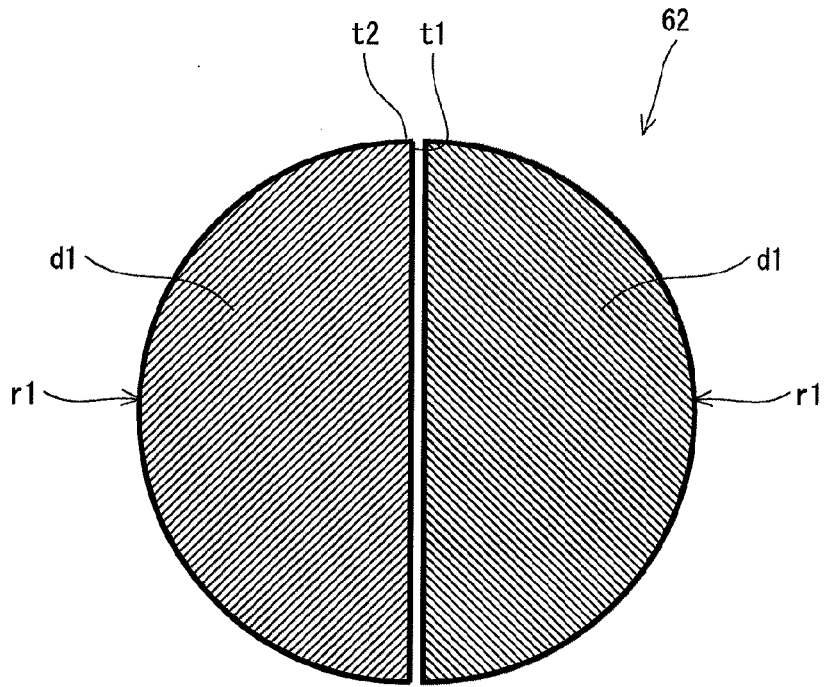

FIG. 9A shows a first intermediate body 60 when the first intermediate body 60 has an overlapping part 58. In each of the prepregs r1 for the rib, a winding finish end part t1 and a winding start end part t2 overlap with each other. FIG. 9B shows a first intermediate body 62 when the first intermediate body 62 has no overlapping part. In the first intermediate body 62, the winding finish end part t1 and the winding start end part t2 are butted to each other.

Figure 10:
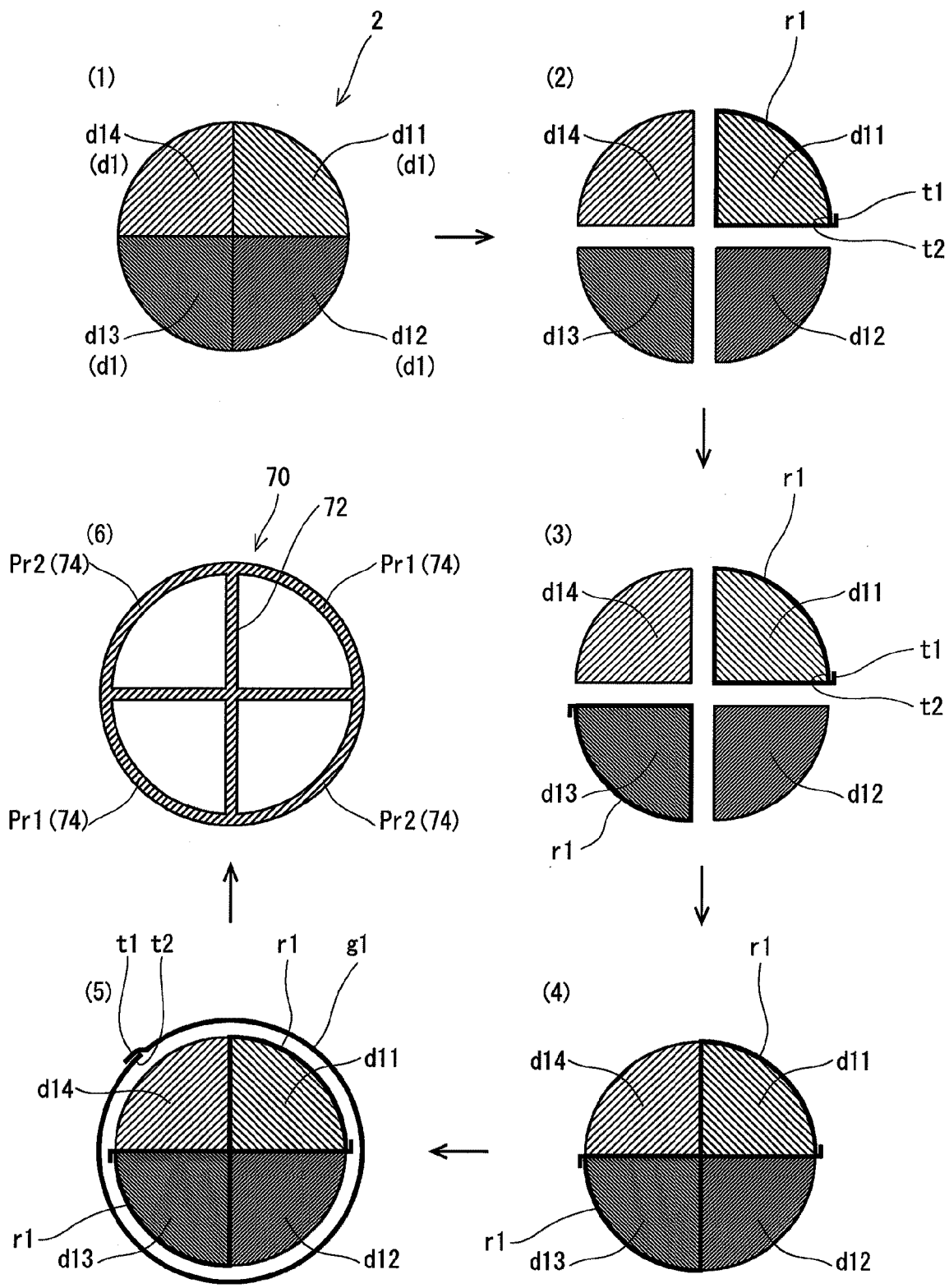
FIG. 10 is a view for explaining a manufacturing method of a fourth embodiment of the present invention.

FIG. 10 is a view for explaining a manufacturing method of a fourth embodiment. A mandrel 2 used in this manufacturing method is the same as that of the first embodiment.

The difference between this fourth embodiment and the first embodiment can be understood by comparing FIG. 10 with FIG. 4. In the embodiment of FIG. 4, the prepreg r1 for the rib is wound around all the divided bodies d1. On the other hand, in this embodiment, the number of the divided bodies d1 around which the prepreg r1 for the rib is wound is two of the four divided bodies d1. This point is shown in of FIGS. 10(3) and 10(4).

As described above, the mandrel 2 is equally divided in the circumferential direction. The division number of the mandrel 2 is even (four).

As shown in FIG. 10(3), in the embodiment, the prepreg r1 for the rib is wound around a first divided body d11 and a third divided body d13. The prepreg r1 for the rib is not wound around a second divided body d12 and a fourth divided body d14. As shown in FIG. 10(4), in the embodiment, the divided bodies d1 (d11, d13) around which the prepreg r1 for the rib is wound and the divided bodies d1 (d12, d14) around which prepreg r1 for the rib is not wound are alternately disposed in the circumferential direction in the mandrel of the combined state. FIG. 10(4) is a cross sectional view of the first intermediate body.

As shown in FIG. 10(6), as a result of the fourth embodiment, a shaft 70 is obtained. This shaft 70 also has a rib 72 having a sectional shape of "plus (+)" and an outer peripheral part 74 as in the shaft 18. FIG. 10(6) is a cross sectional view only showing a schematic configuration of the shaft 70. The detail of thickness distribution or the like is not considered in FIG. 10(6).

The thickness of the rib 72 of the shaft 70 is substantially fixed as in the shaft 18.

When the shaft 70 is compared with the shaft 18, the number of layers of the shaft 70 is different from that of the shaft 18. The number of layers of the rib 72 of the shaft 70 is 1. The thickness of the rib 72 is equivalent to the thickness of the prepreg r1 for the rib. Compared with this shaft 70, the number of layers of the rib 16 of the shaft 18 is 2. In the shaft 18, a prepreg r1 for a rib of a certain divided body d1 and a prepreg r1 for a rib of a divided body d1 adjacent to the certain divided body d1 overlap with each other. Therefore, the thickness of the rib 16 is equivalent to the double of the thickness of the prepreg r1 for the rib.

In the shaft 70, the thickness of the outer peripheral part 74 is not fixed in the circumferential direction. A portion in which a prepreg g1 for an outer peripheral part and a prepreg r1 for a rib overlap with each other and a portion in which the prepreg g1 for the outer peripheral part and the prepreg r1 for the rib do not overlap with each other exist on the outer peripheral part 74. That is, a portion Pr1 in which the prepreg r1 for the rib exists on the inner side of the outer peripheral part 74, and a portion Pr2 in which the prepreg r1 for the rib does not exist on the inner side thereof are mixed on the outer peripheral part 74. In the cross sectional view of the shaft 70, the portions Pr1 and the portions Pr2 are alternately disposed in the circumferential direction. In the present invention, such an embodiment is also possible. When the prepreg r1 for the rib is a hoop layer (the [embodiment 1]) as in a example which will be described below, the mixing of the portion Pr1 and the portion Pr2 does not substantially inhibit the homogeneity of the shaft 70 in the circumferential direction.

As described above, in the embodiment, the divided body d1 around which the prepreg r1 for the rib is wound, and the divided body d1 around which the prepreg r1 for the rib is not wound are alternately disposed in the circumferential direction in the mandrel of the combined state. This disposal uniforms the thickness of the rib 72. The disposal can suppress the mass of the rib and provide the rib having a substantially uniform thickness. Structural and physical symmetries tend to be obtained by the disposal.

In the embodiment, the rib is provided over the entire longitudinal direction of the shaft. The present invention is not limited to the embodiment. The rib may be provided on a portion of a length of the shaft. The position and range of the rib in the longitudinal direction are determined by the winding position and winding range of the prepreg r1 for the rib. The rib is provided on only a portion of the shaft in the longitudinal direction by setting the winding range of the prepreg r1 for the rib to a portion of the shaft in the longitudinal direction. An example of the embodiment is shown in a example which will be described below.

The prepreg used for the prepreg r1 for the rib is not limited. The rib effectively suppresses the crushing of the shaft. Particularly, in the case of the shaft having a thin outer peripheral part, bending is apt to be interlocked with crushing. The crushing is modification in which the section of the shaft has an elliptical shape. When the crushing of the shaft is suppressed, due to the interlocking of the bending and the crushing, the bending strength of the shaft can be enhanced. In respect of suppressing the crushing to enhance the strength of the shaft, it is preferable that the prepreg r1 for the rib includes a hoop layer. The prepreg which forms the hoop layer is also referred to as a prepreg for a hoop layer in the present application.

An angle $\theta 1$ (degrees) between the fiber of the prepreg r1 for the rib and the longitudinal direction is not limited. The following configurations are exemplified as a preferred angle $\theta 1$.

[Configuration 1]: The angle $\theta 1$ is close to 90 degrees. Specifically, the angle $\theta 1$ is equal to or greater than 70 degrees, furthermore equal to or greater than 80 degrees, and furthermore equal to or greater than 85 degrees. The angle $\theta 1$ is equal to or less than 110 degrees, furthermore equal to or less than 100 degrees, and furthermore equal to or less than 95 degrees.

[Configuration 2]: The angle $\theta 1$ is close to 0 degree. Specifically, the angle $\theta 1$ is equal to or greater than −10 degrees, and furthermore equal to or greater than −5 degrees. The angle $\theta 1$ is equal to or less than 10 degrees, and furthermore equal to or less than 5 degrees. −10 degrees are equal to 170 degrees, and −5 degrees are equal to 175 degrees.

[Configuration 3]: The angle $\theta 1$ is equal to or greater than 10 degrees, furthermore equal to or greater than 20 degrees, and furthermore equal to or greater than 30 degrees. The angle $\theta 1$ is less than 80 degrees, furthermore equal to or less than 70 degrees, and furthermore equal to or less than 60 degrees.

[Configuration 4]: The angle $\theta 1$ is equal to or greater than 100 degrees, furthermore equal to or greater than 110 degrees, and furthermore equal to or greater than 120 degrees. The angle $\theta 1$ is less than 170 degrees, furthermore equal to or less than 160 degrees, and furthermore equal to or less than 150 degrees.

[Configuration 5]: A textile obtained by weaving fibers is included. This textile includes a fiber oriented in at least two directions. Due to the textile, the angle $\theta 1$ is equal to or greater than two kinds.

When the winding number of the prepreg r1 for the rib is greater than 0.00 and less than 2.00 (furthermore, 1.00 or greater and less than 2.00), the [Configuration 1], [Configuration 3], [Configuration 4] or [Configuration 5] is preferable in view of strength, and the [Configuration 1] or [Configuration 5] is more preferable.

When the winding number of the prepreg r1 for the rib is equal to or greater than 2.00, the following item (a), (b) or (c) is preferable in view of the strength.

(a) [Configuration 1] and [Configuration 2] are included.
(b) [Configuration 5] is included.
(c) [Configuration 3] and [Configuration 4] are included.

When two kinds or more of prepregs having a different angle $\theta 1$ are used as the prepreg r1 for the rib, the prepregs r1 for the rib may be laminated together in the laminating process. Particularly, when the prepreg of the [Configuration 1] and a prepreg having a angle $\theta 1$ different from that of this [Configuration 1] are used as the prepreg r1 for the rib, they are preferably laminated together. This laminating can enhance the winding accuracy and winding workability of the prepreg of the [Configuration 1]. An example in which the prepregs r1 for the rib are laminated together is example 3 which will be described below.

The prepreg used for the prepreg g1 for the outer peripheral part is not limited. Usually, the outer peripheral part has a straight layer and a bias layer. A prepreg forming the straight layer is also referred to as a prepreg for a straight layer in the present application. A prepreg forming the bias layer is also referred to as a prepreg for a bias layer in the present application. The bias layer is also referred to as an oblique layer.

A straight layer is a layer in which the orientation direction of a fiber is substantially made parallel to the axial direction of the shaft. The incompletely parallel orientation direction of the fiber to the axial direction of the shaft is usually caused by an error or the like in winding. The error of ±10 degrees to the axial line of the shaft is permitted for the orientation angle of the fiber of the straight layer.

The winding number (number of layers) of the straight layer is not limited. The straight layer mainly correlates with the bending strength of the shaft and the flexural rigidity of the shaft. The winding number of the straight layer is determined in consideration of the flexural rigidity of the shaft, the strength of the shaft, and the elastic modulus of a carbon fiber contained in the straight layer, or the like.

In the present application, the winding number can have digits after the decimal point. For example, when the prepreg is exactly wound by half a circle, the winding number is 0.5. As shown in FIG. 5A described above, when the winding finish end part t1 and the winding start end part t2 slightly overlap with each other, the winding number is, for example, 1.01 or greater and 1.05 or less.

The bias layer is a layer in which the orientation direction of a fiber is substantially inclined to the axial direction of the shaft. Usually, a set of bias layers which are inclined in the reverse directions to each other are used. Usually, an angle between the carbon fiber of the bias layer and the axial direction of the shaft is ±45 degrees. The orientation direction of the fiber to the axial direction of the shaft is usually incompletely 45 degrees due to an error or the like in winding. The angle of the bias layer may not be set to 45 degrees. In respect of torsional rigidity and torsional strength, an absolute value of an angle between the bias layer and the axial direction of the shaft is preferably 25 degrees or greater and 65 degrees or less.

The winding number (number of layers) of the bias layer is not limited. The bias layer mainly correlates with the torsional strength of the shaft and the torsional rigidity of the shaft. The winding number of the bias layer is determined in consideration of the torsional rigidity of the shaft, the torsional strength of the shaft, and the elastic modulus of a carbon fiber contained in the bias layer, or the like.

A prepreg of the prepreg g1 for the outer peripheral part being in contact with and wound around the first intermediate body is also referred to as a prepreg X1 in the present application. In other words, the prepreg g1 for the outer peripheral part being in contact with and wound around the prepreg r1 for the rib is the prepreg X1. In all examples which will be described below, the prepreg for the bias layer is the prepreg X1. An angle between the fiber of prepreg X1 and the axis line of the shaft is set to $\theta 2$ (degree).

An absolute value $|\theta 1 - \theta 2|$ of the difference between this angle $\theta 2$ and the angle $\theta 1$ has a preferred range. In respects of enhancing rigidity on the interface between a main body portion (a portion other than the rib of the tubular body) of the tubular body and the rib, and of suppressing breakage in the vicinity of the interface, the absolute value |θ1−θ2| is preferably equal to or greater than 20 degrees, and more preferably equal to or greater than 30 degrees. The absolute value |θ1−θ2| is also preferably equal to or less than 70 degrees, and more preferably equal to or less than 60 degrees. When two or more layers of the prepregs for the rib being in contact with the main body portion of the tubular body exist, it is only necessary that the angle θ1 in at least one layer of the two or more layers satisfy the preferred range of the absolute value |θ1−θ2|. When the fiber of the prepreg for the rib is a textile, it is only necessary that the angle θ1 in at least one kind of the textile satisify the preferred range of the absolute value |θ1−θ2|.

When the torsional rigidity of the shaft is excessively small, the directional stability of a hitting ball and the strength of the shaft are apt to be insufficient. In respect of the torsional rigidity of the shaft, the total winding number Tb1 of the bias layer is preferably equal to or greater than 2, more preferably equal to or greater than 3, and still more preferably equal to or greater than 4. In respect of the weight reduction of the shaft, the total winding number Tb1 is preferably equal to or less than 8, more preferably equal to or less than 7, and still more preferably equal to or less than 6. When the number of the bias layers in which the angle to the axis line of the shaft is +45 degrees is B1, and the number of the bias layers in which the angle to the axis line of the shaft is −45 degrees is B2, the total winding number Tb1 is [B1+B2].

A layer (tip end part reinforcing layer) which reinforces the tip end part is provided on the outer peripheral part if needed. A large impact force is apt to act on the tip end part of the shaft in hitting. This tip end part reinforcing layer can enhance the strength of the shaft effectively. In respect of strength, the tip end part reinforcing layer is preferably the straight layer. The prepreg forming the tip end part reinforcing layer may be the prepreg g1 for the outer peripheral part, or may be the prepreg r1 for the rib.

A layer (butt end part reinforcing layer) which reinforces the butt end part is provided on the outer peripheral part if needed. In respect of bending strength, the butt end part reinforcing layer is preferably the straight layer. On the other hand, the outer diameter of the butt end part is comparatively large. A portion having a large outer diameter and being thin is apt to be crushed. In respect of crushing rigidity, the butt end part reinforcing layer is preferably the hoop layer. A prepreg forming the butt end part reinforcing layer may be the prepreg g1 for the outer peripheral part, or may be the prepreg r1 for the rib.

The division number of the mandrel is not limited. In respect of providing the rib, the division number of the mandrel is set to be equal to or greater than 2. In respects of enhancing a reinforcing effect caused by the rib and of enhancing homogeneity in the circumferential direction, the division number of the mandrel is preferably equal to or greater than 3, and more preferably equal to or greater than 4. In respect of productivity, and in respect of preventing the excessive mass of the rib, the division number of the mandrel is preferably equal to or less than 10, and more preferably equal to or less than 6.

A length L of the overlapping part Tf in the circumferential direction is not limited. The winding finish end part t1 and the winding start end part t2 may not overlap with each other due to variance in cutting dimension or the like. In respect of reducing such a case, the length L is preferably equal to or greater than 0.3 (mm), more preferably equal to or greater than 0.4 (mm), and still more preferably equal to or greater than 0.5 (mm). In respect of suppressing the weight of the shaft, the length L is preferably equal to or less than 3.0 (mm), more preferably equal to or less than 2.5 (mm), and still more preferably equal to or less than 2.0 (mm).

A resin content rate R1 of the prepreg r1 for the rib is not limited. When the resin content rate R1 is excessively small, tack property (adhesion) is reduced to complicate the winding of the prepreg r1 for the rib to the divided body. In this respect, the resin content rate R1 is preferably equal to or greater than 24% by mass, more preferably equal to or greater than 25% by mass, and still more preferably equal to or greater than 26% by mass. When the resin content rate R1 is excessively great, burr due to an excess resin is frequently generated after a curing process to complicate the extraction of the mandrel. In this respect, the resin content rate R1 is preferably equal to or less than 40% by mass, more preferably equal to or less than 38% by mass, and still more preferably equal to or less than 36% by mass.

A resin content rate R2 of the prepreg X1 is not limited. When the resin content rate R2 is excessively small, tack property is reduced to complicate the winding of the prepreg X1 to the first intermediate body. In this respect, the resin content rate R2 is preferably equal to or greater than 20% by mass, more preferably equal to or greater than 22% by mass, and still more preferably equal to or greater than 24% by mass. In respect of weight reduction, the resin content rate R2 is preferably equal to or less than 30% by mass, more preferably equal to or less than 28% by mass, and still more preferably equal to or less than 26% by mass.

A ratio (R1/R2) is not limited. The divided body is thinner than the mandrel of the combined state. The sectional shape of the divided body is noncircular. Therefore, it is hard to perform the winding of the prepreg to the divided body as compared to the winding of the prepreg to the mandrel having a circular section. In respect of facilitating the winding of the prepreg to the divided body, the resin content rate R1 is preferably greater than the resin content rate R2. When the resin content rate R2 is excessively great, the weight is increased. In these respects, the ratio (R1/R2) is preferably equal to or greater than 1.2, and more preferably equal to or greater than 1.5. When the resin content rate R1 is excessively great, or when the resin content rate R2 is excessively small, the resin content rates R1 and R2 are not preferable as described above. Therefore, the ratio (R1/R2) is preferably equal to or less than 1.9, and more preferably equal to or less than 1.7.

The fiber used for the prepreg is not limited. In respects of strength and elastic modulus, a carbon fiber is preferable.

The carbon fiber is not limited. As the carbon fiber, a PAN carbon fiber and a pitch carbon fiber are exemplified. In respect of strength, the PAN carbon fiber is preferable. In respect of a high degree of freedom of the elastic modulus, the pitch carbon fiber is preferable.

The PAN carbon fiber is derived from polyacrylonitrile. The PAN carbon fiber is obtained by firing polyacrylonitrile.

The pitch carbon fiber is derived from pitch. The pitch carbon fiber is obtained by spinning and heat treating the pitch. The typical example of the pitch is petroleum pitch. The petroleum pitch is a residue when distilling crude oil at high temperature. Examples of the pitch carbon fiber include an isotropic pitch carbon fiber and an anisotropic pitch carbon fiber. The anisotropic pitch carbon fiber is also referred to a mesophase pitch carbon fiber. In respect of tending to obtain a high elastic modulus, it is preferable that the pitch carbon fiber is the mesophase pitch carbon fiber.

Examples of prepregs which can be used in the present invention will be shown in Table 1.

TABLE 1

Examples of Usable Prepregs

| Manufacturer | Prepreg sheet number | Thickness of sheet (mm) | Fiber content rate (% by mass) | Resin content rate (% by mass) | Carbon fiber number | Physical property value of carbon fiber | |
|---|---|---|---|---|---|---|---|
| | | | | | | Tensile elastic modulus (t/mm$^2$) | Tensile strength (kgf/mm$^2$) |
| Toray Industries, Inc | 3255S-10 | 0.082 | 76 | 24 | T700S | 23.5 | 500 |
| Toray Industries, Inc | 3255S-12 | 0.103 | 76 | 24 | T700S | 23.5 | 500 |
| Toray Industries, Inc | 3255S-15 | 0.123 | 76 | 24 | T700S | 23.5 | 500 |
| Toray Industries, Inc | 805S-3 | 0.034 | 60 | 40 | M30S | 30 | 560 |
| Toray Industries, Inc | 2255F-10 | 0.082 | 76 | 24 | T800H | 30 | 560 |
| Toray Industries, Inc | 2255F-12 | 0.102 | 76 | 24 | T800H | 30 | 560 |
| Toray Industries, Inc | 2255F-15 | 0.123 | 76 | 24 | T800H | 30 | 560 |
| Toray Industries, Inc | 2255S-10 | 0.082 | 75 | 25 | T800S | 30 | 600 |
| Toray Industries, Inc | 2256S-10 | 0.077 | 80 | 20 | T800S | 30 | 600 |
| Mitsubishi Rayon Co., Ltd. | TR350C-100S | 0.083 | 75 | 25 | TR50S | 24 | 500 |
| Mitsubishi Rayon Co., Ltd. | MR350C-100S | 0.085 | 75 | 25 | MR40 | 30 | 450 |
| Mitsubishi Rayon Co., Ltd. | MR350E-100S | 0.093 | 70 | 30 | MR40 | 30 | 450 |
| Mitsubishi Rayon Co., Ltd. | MR350J-050S | 0.058 | 62.5 | 37.5 | MR40 | 30 | 450 |
| Mitsubishi Rayon Co., Ltd. | MR380G-100S | 0.098 | 67 | 33 | MR40 | 30 | 450 |
| Mitsubishi Rayon Co., Ltd. | MR350E-100S | 0.093 | 70 | 30 | MR40 | 30 | 450 |
| Mitsubishi Rayon Co., Ltd. | HRX350C-075S | 0.057 | 75 | 25 | HR40 | 40 | 450 |
| Mitsubishi Rayon Co., Ltd. | TR3110M | 0.223 | 60 | 40 | TR30S | 24 | 450 |

Tensile strength and tensile elastic modulus are values measured based on JIS R7601: 1986 "carbon fiber test method".

EXAMPLES

Hereinafter, the effects of the present invention will be clarified by example. However, the present invention should not be interpreted in a limited way based on the description of the example.

Example 1

A mandrel divided into three was used, which was shown in FIG. 6A. Prepregs e11 to e17 shown in FIG. 11 were prepared. A shaft having a sectional shape shown in FIG. 6B was obtained in the same manner as in the embodiment.

In example 1, a prepreg e11 was wound around a first divided body; a prepreg e12 was wound around a second divided body; and a prepreg e13 was wound around a third divided body. The winding number of the prepreg e11 to the first divided body was set to 1.05. Since the winding number was greater than 1.00, an overlapping part in which a winding finish end part t1 and a winding start end part t2 overlapped with each other was formed in the prepreg e11. The winding number of the prepreg e12 to the second divided body was set to 1.05. Since the winding number was greater than 1.00, an overlapping part in which a winding finish end part t1 and a winding start end part t2 overlapped with each other was formed in the prepreg e12. The winding number of the prepreg e13 to the third divided body was set to 1.05. Since the winding number was greater than 1.00, an overlapping part in which a winding finish end part t1 and a winding start end part t2 overlapped with each other was formed in the prepreg e13.

Figure 11:
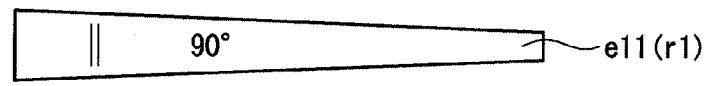
FIG. 11 is a view in which prepregs used for example 1 are arranged from the top in wound order.
Figure 11:
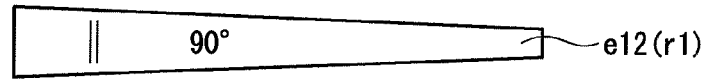
Figure 11:
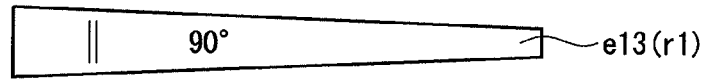
Figure 11:
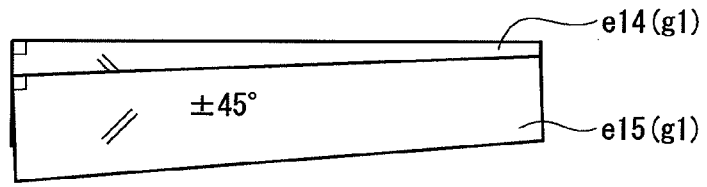
Figure 11:
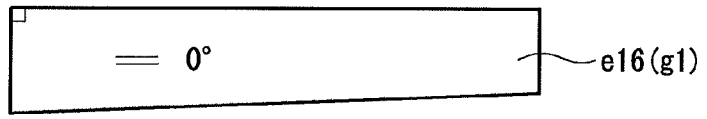
Figure 11:
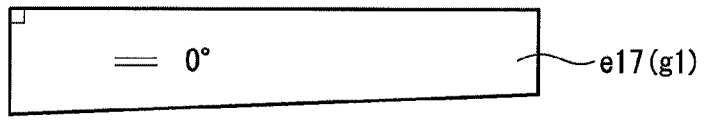

A prepreg e14 and a prepreg e15 were laminated together (see FIG. 11). This set of the laminated prepregs was wound. Even in all other examples, a bias layer was wound by this method.

Specifications of example 1 are shown in Tables 2 and 3.

Example 2

A mandrel divided into four was used, which was shown in FIG. 2. Prepregs e21 to e28 shown in FIG. 12 were prepared. A shaft having a sectional shape shown in FIG. 4(6) was obtained in the same manner as in the embodiment.

In example 2, a prepreg e21 was wound around a first divided body; a prepreg e22 was wound around a second divided body; a prepreg e23 was wound around a third divided body; and a prepreg e24 was wound around a fourth divided body. The winding number of the prepreg e21 to the first divided body was set to 1.05. The winding number of the prepreg e22 to the second divided body was set to 1.05. The winding number of the prepreg e23 to the third divided body was set to 1.05. The winding number of the prepreg e24 to the fourth divided body was set to 1.05.

Specifications of example 2 are shown in Tables 2 and 4.

Example 3

A mandrel divided into four was used, which was shown in FIG. 2. Prepregs e31 to e40 shown in FIG. 13 were prepared.

Figure 13:
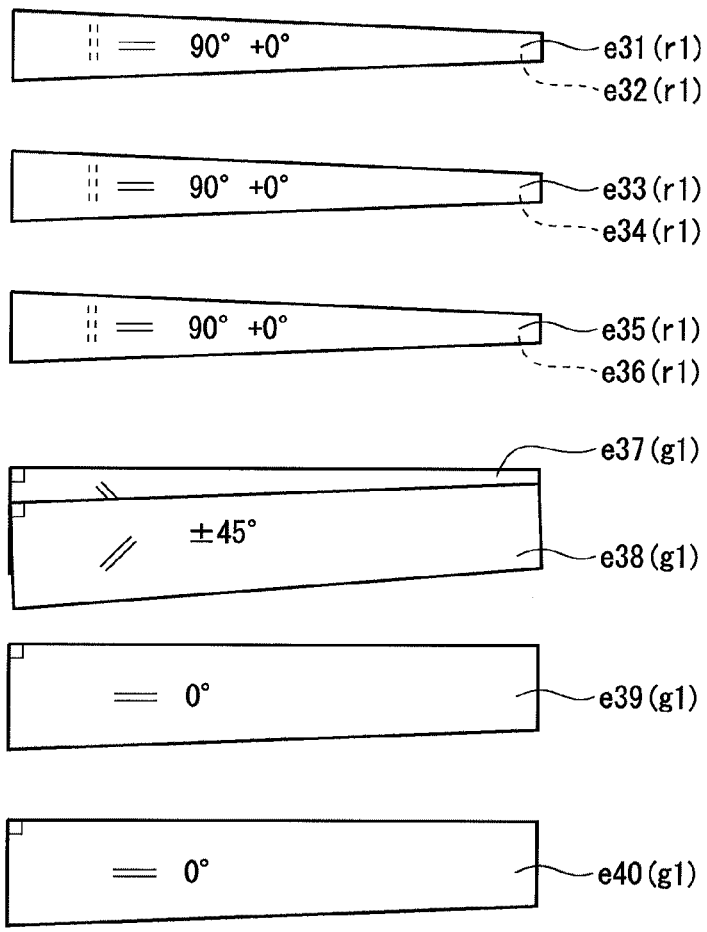
FIG. 13 is a view in which prepregs used for example 3 are arranged from the top in wound order.

In example 3, prepregs r1 for a rib were laminated together. In example 3, the prepreg r1 for the rib of the [Configuration 1] and the prepreg r1 for the rib of the [Configuration 2] were laminated together. In FIG. 13, a prepreg e31 and a prepreg e32 overlap with each other. The prepreg e31 is a prepreg for a straight layer. The prepreg e32 is a prepreg for a hoop layer. The prepreg e31 and the prepreg e32 were laminated together. This set of the laminated prepregs was wound around a divided body d1. Similarly, after a prepreg e33 and a prepreg e34 were laminated together, the laminated prepregs e33 and e34 were wound around the divided body d1. Similarly, after a prepreg e35 and a prepreg e36 were laminated together, the laminated prepregs e35 and e36 were wound around the divided body d1.

A shaft according to example 3 was obtained in the same manner as in example 1 except for items shown in Table 2, Table 5 and FIG. 13.

Since the prepreg for the hoop layer and the prepreg for the straight layer (the prepreg other than the prepreg for the hoop layer) are laminated together in this example 3, the prepreg for the hoop layer is not torn along the direction of the fiber in winding. Therefore, the workability in winding the prepreg for the hoop layer around the divided body is enhanced.

Example 4

A mandrel divided into two was used, which was shown in FIG. 8A. Prepregs e41 to e46 shown in FIG. 14 were prepared. A shaft having a sectional shape shown in FIG. 8B was obtained in the same manner as in the embodiment.

In example 4, a prepreg e41 was wound around a first divided body, and a prepreg e42 was wound around a second divided body. The winding number of the prepreg e41 to the first divided body was set to 1.05. The winding number of the prepreg e42 to the second divided body was set to 1.05.

Specifications of example 4 are shown in Tables 2 and 6.

Example 5

A mandrel divided into four was used, which was shown in FIG. 2. Prepregs e51 to e56 shown in FIG. 15 were prepared. A shaft having a sectional shape shown in FIG. 10(6) was obtained in the same manner as in the embodiment shown in FIG. 10. As described in the embodiment shown in FIG. 10, in this embodiment 5, in the mandrel of the combined state, divided bodies around which a prepreg r1 for a rib was wound and divided bodies around which a prepreg r1 for a rib was not wound were alternately disposed in a circumferential direction.

In example 5, a prepreg e51 was wound around a first divided body, and a prepreg e52 was wound around a third divided body. The winding number of the prepreg e51 to the first divided body was set to 1.05. The winding number of the prepreg e52 to the third divided body was set to 1.05.

Specifications of example 5 are shown in Tables 2 and 7.

Example 6

Figure 16:
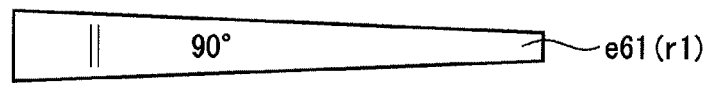
FIG. 16 is a view in which prepregs used for example 6 are arranged from the top in wound order.
Figure 16:
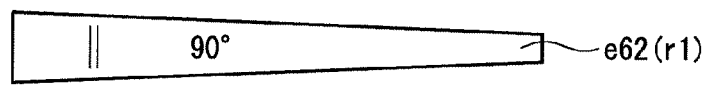
Figure 16:
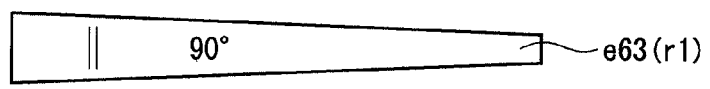
Figure 16:
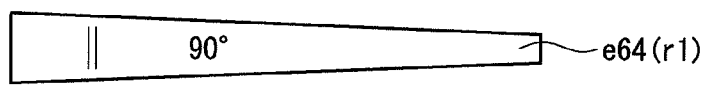
Figure 16:
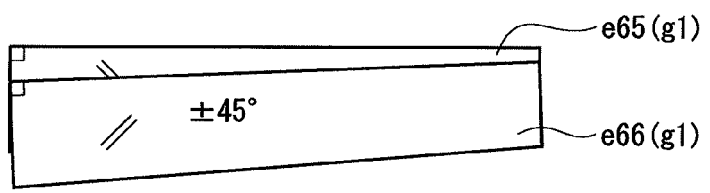
Figure 16:
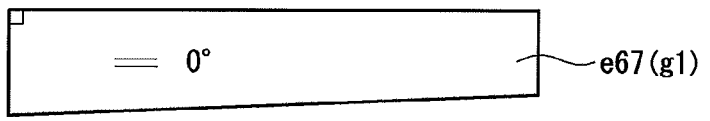
Figure 16:
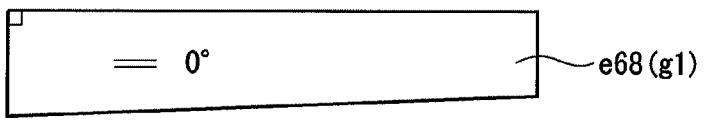

A shaft according to example 6 was obtained in the same manner as in example 2 except for items shown in Table 2, Table 8 and FIG. 16.

Example 7

Figure 17:
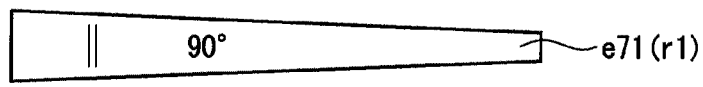
FIG. 17 is a view in which prepregs used for example 7 are arranged from the top in wound order.
Figure 17:
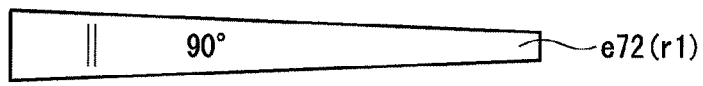
Figure 17:
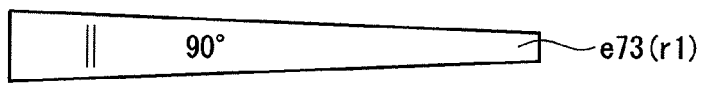
Figure 17:
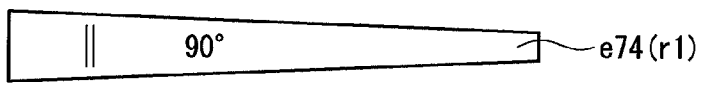
Figure 17:
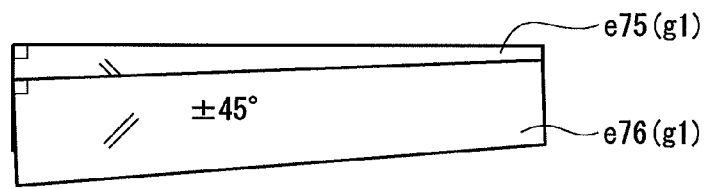
Figure 17:
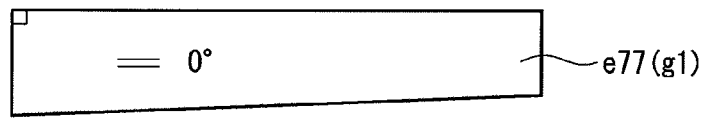
Figure 17:
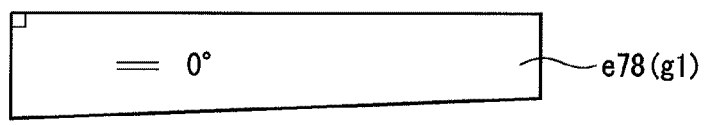

A shaft according to example 7 was obtained in the same manner as in example 2 except for items shown in Table 2, Table 9 and FIG. 17.

Example 8

Figure 18:
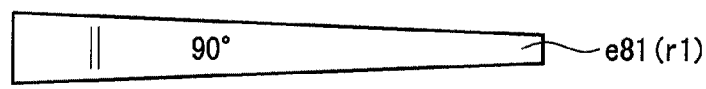
FIG. 18 is a view in which prepregs used for example 8 are arranged from the top in wound order.
Figure 18:
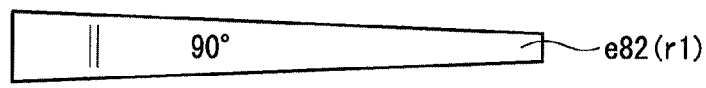
Figure 18:
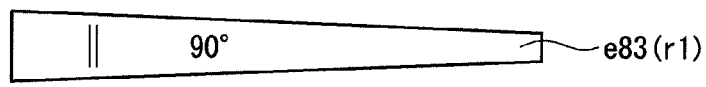
Figure 18:
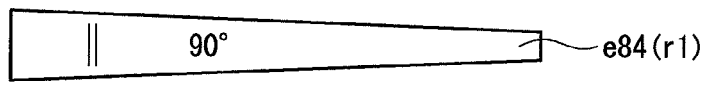
Figure 18:
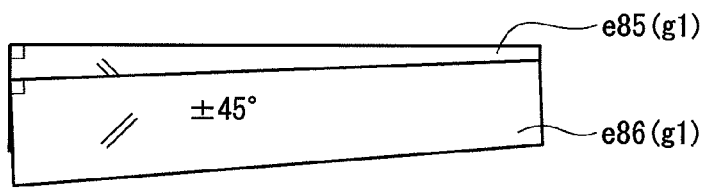
Figure 18:
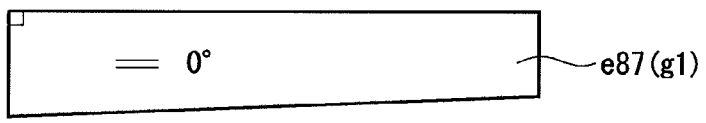
Figure 18:

A shaft according to example 8 was obtained in the same manner as in example 2 except for items shown in Table 2, Table 10 and FIG. 18.

Example 9

Figure 19:
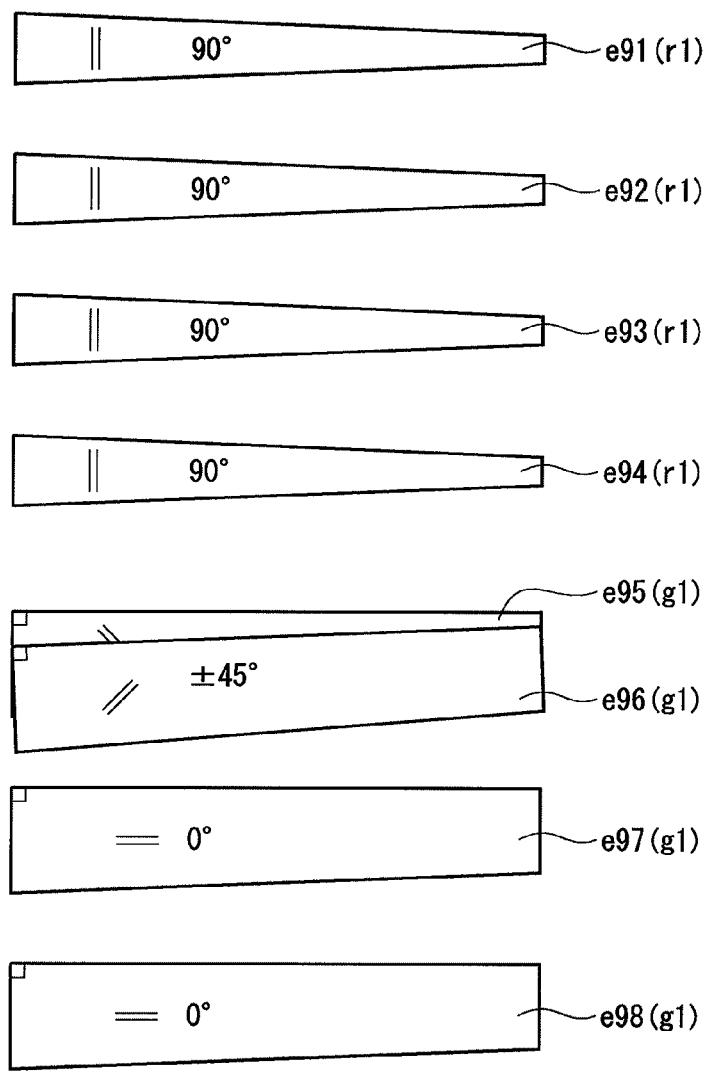
FIG. 19 is a view in which prepregs used for example 9 are arranged from the top in wound order.

A shaft according to example 9 was obtained in the same manner as in example 2 except for items shown in Table 2, Table 11 and FIG. 19.

Example 10

Figure 20:
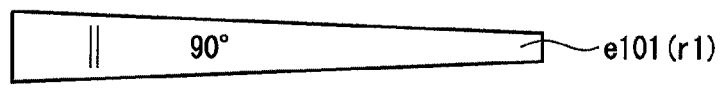
FIG. 20 is a view in which prepregs used for example 10 are arranged from the top in wound order.
Figure 20:
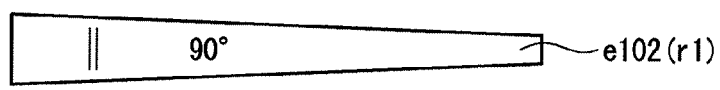
Figure 20:
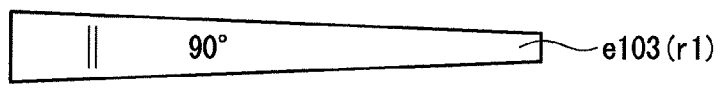
Figure 20:
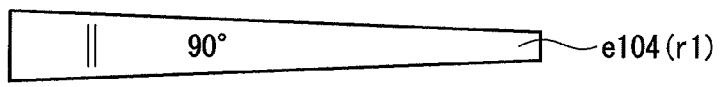
Figure 20:
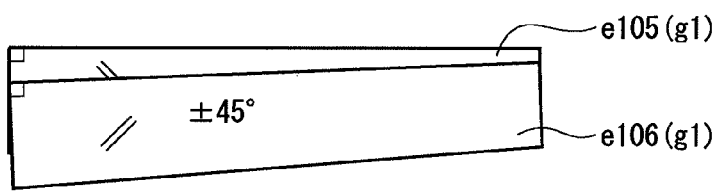
Figure 20:
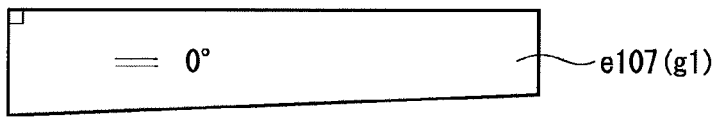
Figure 20:
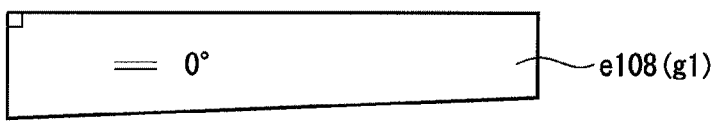

A shaft according to example 10 was obtained in the same manner as in example 2 except for items shown in Table 2, Table 12 and FIG. 20.

Example 11

Figure 21:
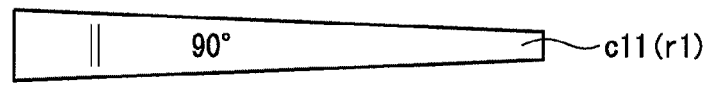
FIG. 21 is a view in which prepregs used for example 11 are arranged from the top in wound order.
Figure 21:
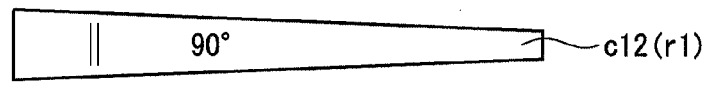
Figure 21:
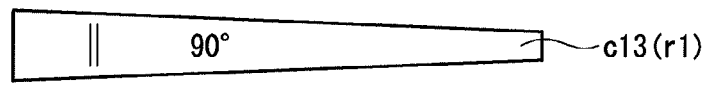
Figure 21:
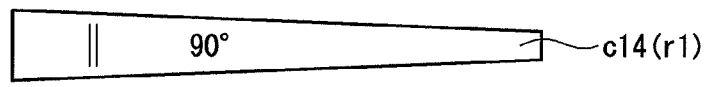
Figure 21:
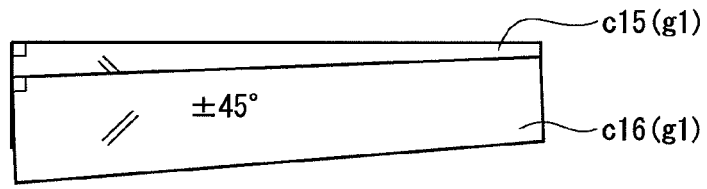
Figure 21:
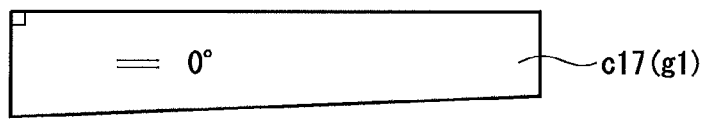
Figure 21:
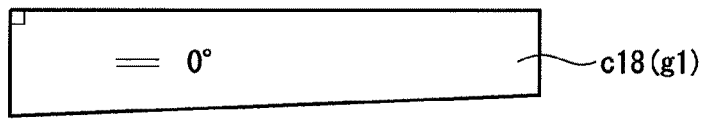

A shaft according to example 11 was obtained in the same manner as in example 2 except for items shown in Table 2, Table 13 and FIG. 21.

Example 12

Figure 22:
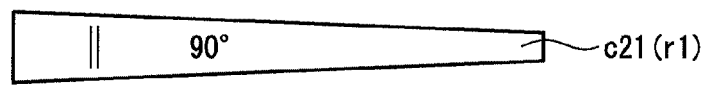
FIG. 22 is a view in which prepregs used for example 12 are arranged from the top in wound order.
Figure 22:
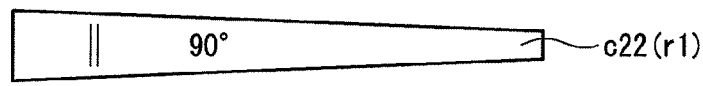
Figure 22:
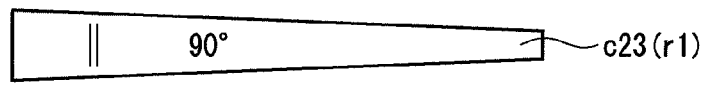
Figure 22:
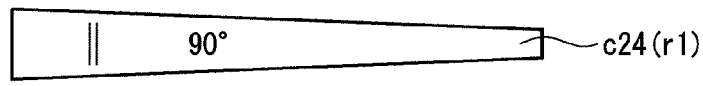
Figure 22:
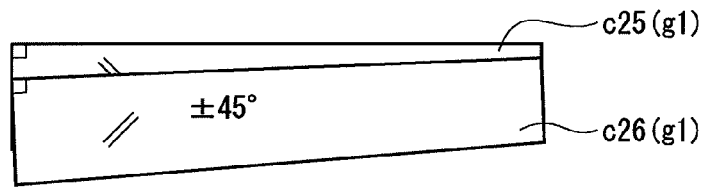
Figure 22:
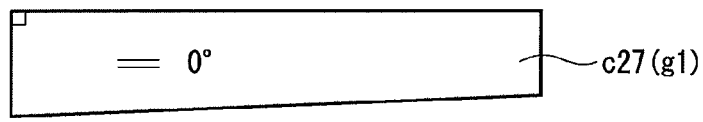
Figure 22:
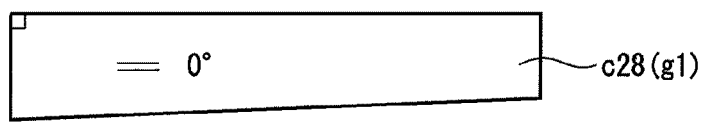

A shaft according to example 12 was obtained in the same manner as in example 2 except for items shown in Table 2, Table 14 and FIG. 22.

Example 13

Figure 23:
FIG. 23 is a view in which prepregs used for example 13 are arranged from the top in wound order.
Figure 23:
Figure 23:
Figure 23:
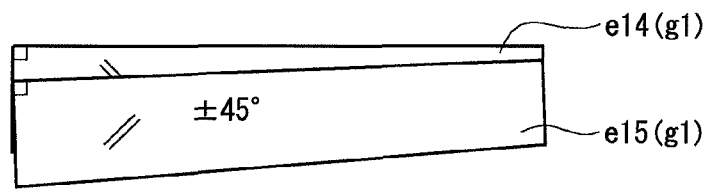
Figure 23:
Figure 23:
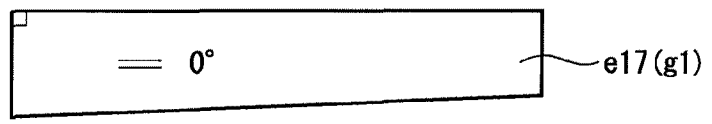

As shown in FIG. 23, a length of a prepreg r1 for a rib in an axial direction was made shorter than the full length of a shaft. Three prepregs r1 for the rib were disposed on the butt end part of the shaft. A shaft according to example 13 was obtained in the same manner as in example 1 except that a prepreg f11 (see FIG. 23) was used in place of the prepreg e11; a prepreg f12 (see FIG. 23) was used in place of the prepreg e12; and a prepreg f13 (see FIG. 23) was used in place of the prepreg e13. Specifications of this shaft are shown in Table 2, Table 15 and FIG. 23.

In the manufacturing method of example 13, the longitudinal length of the prepreg r1 for the rib (f11, f12, f13) is made shorter than the full length of a tubular body (the full length of the shaft). The longitudinal position of the rib is adjusted based on the winding position of the prepreg r1 for the rib in the divided body. In example 13, the rib was disposed on a portion of the longitudinal direction (on the butt end part).

The longitudinal position of the rib is determined by the winding position (the longitudinal winding position) of the prepreg r1 for the rib. Since the prepreg r1 for the rib is disposed on the butt end part in example 13, the rib is formed on the butt end part. For example, when the prepreg r1 for the rib is disposed on a tip end part, the rib is formed on the tip end part. The rib can be disposed on a portion of the length of the shaft in the manufacturing method of example 13.

TABLE 2

Figure 12:
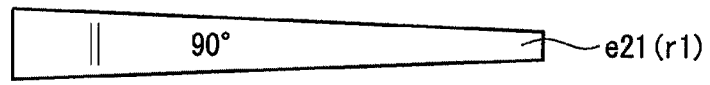
FIG. 12 is a view in which prepregs used for example 2 are arranged from the top in wound order.
Figure 12:
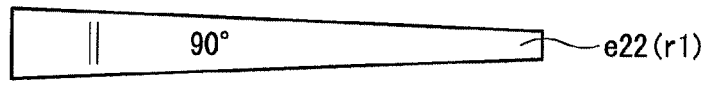
Figure 12:
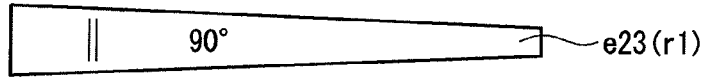
Figure 12:
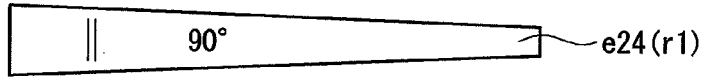
Figure 12:
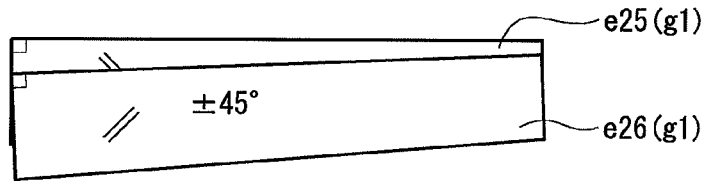
Figure 12:
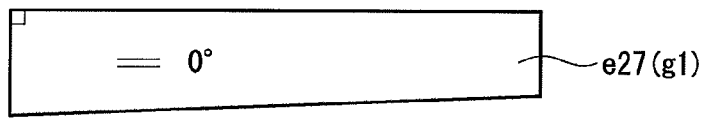
Figure 12:
Figure 14:
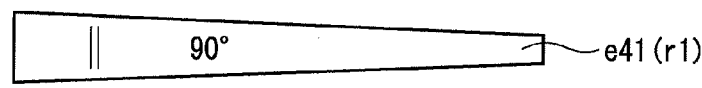
FIG. 14 is a view in which prepregs used for example 4 are arranged from the top in wound order.
Figure 14:
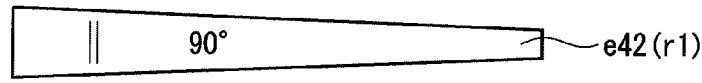
Figure 14:
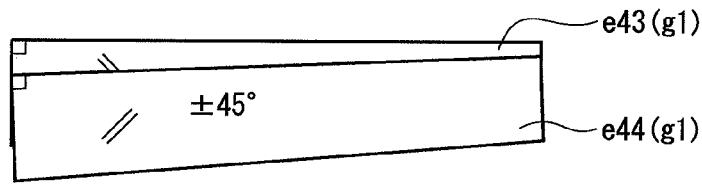
Figure 14:
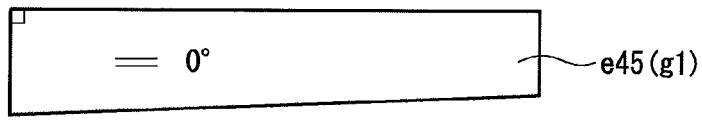
Figure 14:
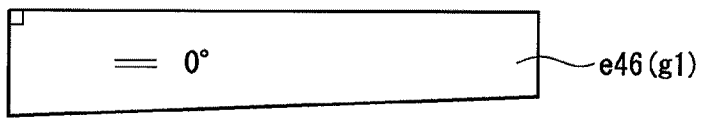
Figure 15:
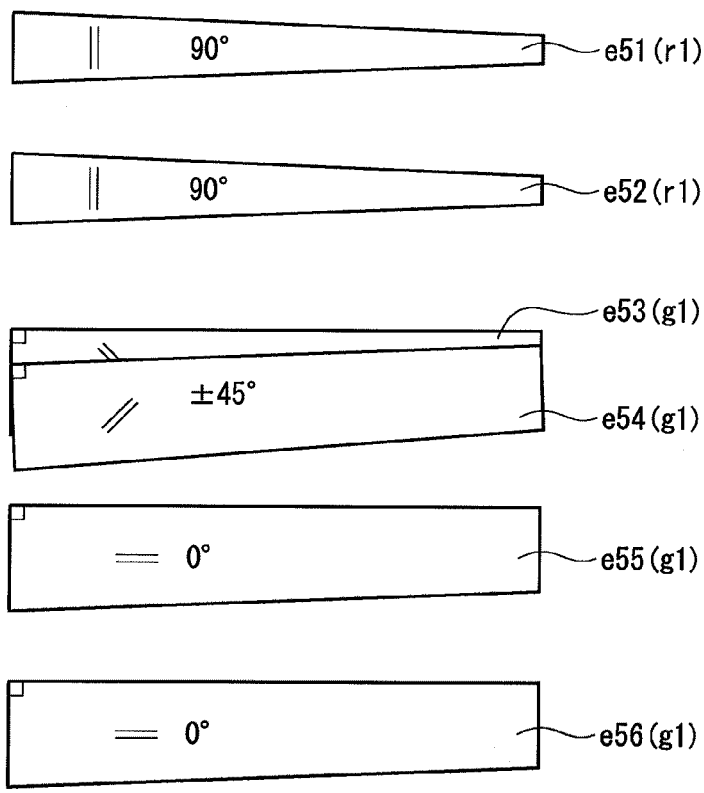
FIG. 15 is a view in which prepregs used for example 5 are arranged from the top in wound order.

| | Specifications of Examples | | | | | | |
|---|---|---|---|---|---|---|---|
| | Example 1 | Example 2 | Example 3 | Example 4 | Example 5 | Example 6 | Example 7 |
| Reference drawing | FIG. 11 | FIG. 12 | FIG. 13 | FIG. 14 | FIG. 15 | FIG. 16 | FIG. 17 |
| Division number of mandrel | 3 | 4 | 3 | 2 | 4 | 4 | 4 |
| Division form of mandrel | Equal in circumferential direction | Equal in circumferential direction | Equal in circumferential direction | Equal in circumferential direction | Equal in circumferential direction | Equal in circumferential direction | Equal in circumferential direction |

TABLE 2-continued

Specifications of Examples

| | | | | | | | |
|---|---|---|---|---|---|---|---|
| Number of prepregs r1 for rib | 3 | 4 | 6 | 2 | 2 | 4 | 4 |
| Number of divided bodies around which prepreg r1 for rib is wound | 3 | 4 | 3 | 2 | 2 | 4 | 4 |
| Existence or nonexistence of overlapping part in prepreg r1 for rib | Existence | Existence | Existence | Existence | Existence | Existence | Existence |
| Longitudinal position of prepreg r1 for rib | Entirety | Entirety | Entirety | Entirety | Entirety | Entirety | Entirety |
| R1/R2 | 1.60 | 1.60 | 1.60 | 1.60 | 1.60 | 2.00 | 1.88 |

| | | Example 8 | Example 9 | Example 10 | Example 11 | Example 12 | Example 13 |
|---|---|---|---|---|---|---|---|
| | Reference drawing | FIG. 18 | FIG. 19 | FIG. 20 | FIG. 21 | FIG. 22 | FIG. 23 |
| | Division number of mandrel | 4 | 4 | 4 | 4 | 4 | 3 |
| | Division form of mandrel | Equal in circumferential direction | Equal in circumferential direction | Equal in circumferential direction | Equal in circumferential direction | Equal in circumferential direction | Equal in circumferential direction |
| | Number of prepregs r1 for rib | 4 | 4 | 4 | 4 | 4 | 3 |
| | Number of divided bodies around which prepreg r1 for rib is wound | 4 | 4 | 4 | 4 | 4 | 3 |
| | Existence or nonexistence of overlapping part in prepreg r1 for rib | Existence | Existence | Existence | Existence | Existence | Existence |
| | Longitudinal position of prepreg r1 for rib | Entirety | Entirety | Entirety | Entirety | Entirety | Back end part |
| | R1/R2 | 1.65 | 1.20 | 1.50 | 1.10 | 0.80 | 1.60 |

TABLE 3

Specifications of Example 1

| Wound order (from inner side) | Sign | Prepreg number | Orientation angle of fiber (degree) | Winding number | Classification | Prepreg for rib r1 | Prepreg for outer peripheral part g1 |
|---|---|---|---|---|---|---|---|
| 1 | e11 | 805S-3 | 90 | 1 | Hoop layer | ○ | |
| 2 | e12 | 805S-3 | 90 | 1 | Hoop layer | ○ | |
| 3 | e13 | 805S-3 | 90 | 1 | Hoop layer | ○ | |
| 4 | e14 | HRX350C-075S | 45 | 1 | Bias layer | | ○ |
| | e15 | HRX350C-075S | −45 | 1 | Bias layer | | ○ |
| 5 | e16 | 2255S-10 | 0 | 1 | Straight layer | | ○ |
| 6 | e17 | 2255S-10 | 0 | 1 | Straight layer | | ○ |

TABLE 4

Specifications of Example 2

| Wound order (from inner side) | Sign | Prepreg number | Orientation angle of fiber (degree) | Winding number | Classification | Prepreg for rib r1 | Prepreg for outer peripheral part g1 |
|---|---|---|---|---|---|---|---|
| 1 | e21 | 805S-3 | 90 | 1 | Hoop layer | ○ | |
| 2 | e22 | 805S-3 | 90 | 1 | Hoop layer | ○ | |
| 3 | e23 | 805S-3 | 90 | 1 | Hoop layer | ○ | |
| 4 | e24 | 805S-3 | 90 | 1 | Hoop layer | ○ | |
| 5 | e25 | HRX350C-075S | 45 | 1 | Bias layer | | ○ |
| | e26 | HRX350C-075S | −45 | 1 | Bias layer | | ○ |
| 6 | e27 | 2255S-10 | 0 | 1 | Straight layer | | ○ |
| 7 | e28 | 2255S-10 | 0 | 1 | Straight layer | | ○ |

TABLE 5

Specifications of Example 3

| Wound order (from inner side) | Sign | Prepreg number | Orientation angle of fiber (degree) | Winding number | Classification | Prepreg for rib r1 | Prepreg for outer peripheral part g1 |
|---|---|---|---|---|---|---|---|
| 1 | e31 | 805S-3 | 0 | 1 | Straight layer | ○ | |
|   | e32 | 805S-3 | 90 | 1 | Hoop layer | ○ | |
| 2 | e33 | 805S-3 | 0 | 1 | Straight layer | ○ | |
|   | e34 | 805S-3 | 90 | 1 | Hoop layer | ○ | |
| 3 | e35 | 805S-3 | 0 | 1 | Straight layer | ○ | |
|   | e36 | 805S-3 | 90 | 1 | Hoop layer | ○ | |
| 4 | e37 | HRX350C-075S | 45 | 1 | Bias layer | | ○ |
|   | e38 | HRX350C-075S | −45 | 1 | Bias layer | | ○ |
| 5 | e39 | 2255S-10 | 0 | 1 | Straight layer | | ○ |
| 6 | e40 | 2255S-10 | 0 | 1 | Straight layer | | ○ |

TABLE 6

Specifications of Example 4

| Wound order (from inner side) | Sign | Prepreg number | Orientation angle of fiber (degree) | Winding number | Classification | Prepreg for rib r1 | Prepreg for outer peripheral part g1 |
|---|---|---|---|---|---|---|---|
| 1 | e41 | 805S-3 | 90 | 1 | Hoop layer | ○ | |
| 2 | e42 | 805S-3 | 90 | 1 | Hoop layer | ○ | |
| 3 | e43 | HRX350C-075S | 45 | 1 | Bias layer | | ○ |
|   | e44 | HRX350C-075S | −45 | 1 | Bias layer | | ○ |
| 4 | e45 | 2255S-10 | 0 | 1 | Straight layer | | ○ |
| 5 | e46 | 2255S-10 | 0 | 1 | Straight layer | | ○ |

TABLE 7

Specifications of Example 5

| Wound order (from inner side) | Sign | Prepreg number | Orientation angle of fiber (degree) | Winding number | Classification | Prepreg for rib r1 | Prepreg for outer peripheral part g1 |
|---|---|---|---|---|---|---|---|
| 1 | e51 | 805S-3 | 90 | 1 | Hoop layer | ○ | |
| 2 | e52 | 805S-3 | 90 | 1 | Hoop layer | ○ | |
| 3 | e53 | HRX350C-075S | 45 | 1 | Bias layer | | ○ |
|   | e54 | HRX350C-075S | −45 | 1 | Bias layer | | ○ |
| 4 | e55 | 2255S-10 | 0 | 1 | Straight layer | | ○ |
| 5 | e56 | 2255S-10 | 0 | 1 | Straight layer | | ○ |

TABLE 8

Specifications of Example 6

| Wound order (from inner side) | Sign | Prepreg number | Orientation angle of fiber (degree) | Winding number | Classification | Prepreg for rib r1 | Prepreg for outer peripheral part g1 |
|---|---|---|---|---|---|---|---|
| 1 | e61 | 805S-3 | 90 | 1 | Hoop layer | ○ | |
| 2 | e62 | 805S-3 | 90 | 1 | Hoop layer | ○ | |
| 3 | e63 | 805S-3 | 90 | 1 | Hoop layer | ○ | |
| 4 | e64 | 805S-3 | 90 | 1 | Hoop layer | ○ | |
| 5 | e65 | 2256S-10 | 45 | 1 | Bias layer | | ○ |
|   | e66 | 2256S-10 | −45 | 1 | Bias layer | | ○ |
| 6 | e67 | 2256S-10 | 0 | 1 | Straight layer | | ○ |
| 7 | e68 | 2256S-10 | 0 | 1 | Straight layer | | ○ |

TABLE 9

Specifications of Example 7

| Wound order (from inner side) | Sign | Prepreg number | Orientation angle of fiber (degree) | Winding number | Classification | Prepreg for rib r1 | Prepreg for outer peripheral part g1 |
|---|---|---|---|---|---|---|---|
| 1 | e71 | MR350J-050S | 90 | 1 | Hoop layer | ○ | |
| 2 | e72 | MR350J-050S | 90 | 1 | Hoop layer | ○ | |
| 3 | e73 | MR350J-050S | 90 | 1 | Hoop layer | ○ | |
| 4 | e74 | MR350J-050S | 90 | 1 | Hoop layer | ○ | |
| 5 | e75 | 2256S-10 | 45 | 1 | Bias layer | | ○ |
|   | e76 | 2256S-10 | −45 | 1 | Bias layer | | ○ |
| 6 | e77 | 2256S-10 | 0 | 1 | Straight layer | | ○ |
| 7 | e78 | 2256S-10 | 0 | 1 | Straight layer | | ○ |

TABLE 10

Specifications of Example 8

| Wound order (from inner side) | Sign | Prepreg number | Orientation angle of fiber (degree) | Winding number | Classification | Prepreg for rib r1 | Prepreg for outer peripheral part g1 |
|---|---|---|---|---|---|---|---|
| 1 | e81 | MR380G-100S | 90 | 1 | Hoop layer | ○ | |
| 2 | e82 | MR380G-100S | 90 | 1 | Hoop layer | ○ | |
| 3 | e83 | MR380G-100S | 90 | 1 | Hoop layer | ○ | |
| 4 | e84 | MR380G-100S | 90 | 1 | Hoop layer | ○ | |
| 5 | e85 | 2256S-10 | 45 | 1 | Bias layer | | ○ |
|   | e86 | 2256S-10 | −45 | 1 | Bias layer | | ○ |
| 6 | e87 | 2256S-10 | 0 | 1 | Straight layer | | ○ |
| 7 | e88 | 2256S-10 | 0 | 1 | Straight layer | | ○ |

TABLE 11

Specifications of Example 9

| Wound order (from inner side) | Sign | Prepreg number | Orientation angle of fiber (degree) | Winding number | Classification | Prepreg for rib r1 | Prepreg for outer peripheral part g1 |
|---|---|---|---|---|---|---|---|
| 1 | e91 | MR350E-100S | 90 | 1 | Hoop layer | ○ | |
| 2 | e92 | MR350E-100S | 90 | 1 | Hoop layer | ○ | |
| 3 | e93 | MR350E-100S | 90 | 1 | Hoop layer | ○ | |
| 4 | e94 | MR350E-100S | 90 | 1 | Hoop layer | ○ | |
| 5 | e95 | 2255S-10 | 45 | 1 | Bias layer | | ○ |
|   | e96 | 2255S-10 | −45 | 1 | Bias layer | | ○ |
| 6 | e97 | 2255S-10 | 0 | 1 | Straight layer | | ○ |
| 7 | e98 | 2255S-10 | 0 | 1 | Straight layer | | ○ |

TABLE 12

Specifications of Example 10

| Wound order (from inner side) | Sign | Prepreg number | Orientation angle of fiber (degree) | Winding number | Classification | Prepreg for rib r1 | Prepreg for outer peripheral part g1 |
|---|---|---|---|---|---|---|---|
| 1 | e101 | MR350E-100S | 90 | 1 | Hoop layer | ○ | |
| 2 | e102 | MR350E-100S | 90 | 1 | Hoop layer | ○ | |
| 3 | e103 | MR350E-100S | 90 | 1 | Hoop layer | ○ | |
| 4 | e104 | MR350E-100S | 90 | 1 | Hoop layer | ○ | |
| 5 | e105 | 2256S-10 | 45 | 1 | Bias layer | | ○ |
|   | e106 | 2256S-10 | −45 | 1 | Bias layer | | ○ |
| 6 | e107 | 2256S-10 | 0 | 1 | Straight layer | | ○ |
| 7 | e108 | 2256S-10 | 0 | 1 | Straight layer | | ○ |

TABLE 13

Specifications of Example 11

| Wound order (from inner side) | Sign | Prepreg number | Orientation angle of fiber (degree) | Winding number | Classification | Prepreg for rib r1 | Prepreg for outer peripheral part g1 |
|---|---|---|---|---|---|---|---|
| 1 | c11 | MR380G-100S | 90 | 1 | Hoop layer | ○ | |
| 2 | c12 | MR380G-100S | 90 | 1 | Hoop layer | ○ | |
| 3 | c13 | MR380G-100S | 90 | 1 | Hoop layer | ○ | |
| 4 | c14 | MR380G-100S | 90 | 1 | Hoop layer | ○ | |
| 5 | c15 | MR350E-100S | 45 | 1 | Bias layer | | ○ |
|   | c16 | MR350E-100S | −45 | 1 | Bias layer | | ○ |
| 6 | c17 | MR350E-100S | 0 | 1 | Straight layer | | ○ |
| 7 | c18 | MR350E-100S | 0 | 1 | Straight layer | | ○ |

TABLE 14

Specifications of Example 12

| Wound order (from inner side) | Sign | Prepreg number | Orientation angle of fiber (degree) | Winding number | Classification | Prepreg for rib r1 | Prepreg for outer peripheral part g1 |
|---|---|---|---|---|---|---|---|
| 1 | c21 | 2256S-10 | 90 | 1 | Hoop layer | ○ | |
| 2 | c22 | 2256S-10 | 90 | 1 | Hoop layer | ○ | |
| 3 | c23 | 2256S-10 | 90 | 1 | Hoop layer | ○ | |
| 4 | c24 | 2256S-10 | 90 | 1 | Hoop layer | ○ | |
| 5 | c25 | 2255S-10 | 45 | 1 | Bias layer | | ○ |
|   | c26 | 2255S-10 | −45 | 1 | Bias layer | | ○ |
| 6 | c27 | 2255S-10 | 0 | 1 | Straight layer | | ○ |
| 7 | c28 | 2255S-10 | 0 | 1 | Straight layer | | ○ |

TABLE 15

Specifications of Example 13

| Wound order (from inner side) | Sign | Prepreg number | Orientation angle of fiber (degree) | Winding number | Classification | Prepreg for rib r1 | Prepreg for outer peripheral part g1 |
|---|---|---|---|---|---|---|---|
| 1 | f11 | 805S-3 | 90 | 1 | Hoop layer | ○ | |
| 2 | f12 | 805S-3 | 90 | 1 | Hoop layer | ○ | |
| 3 | f13 | 805S-3 | 90 | 1 | Hoop layer | ○ | |
| 4 | e14 | HRX350C-075S | 45 | 1 | Bias layer | | ○ |
|   | e15 | HRX350C-075S | −45 | 1 | Bias layer | | ○ |
| 5 | e16 | 2255S-10 | 0 | 1 | Straight layer | | ○ |
| 6 | e17 | 2255S-10 | 0 | 1 | Straight layer | | ○ |

Since examples 11 and 12 had a low ratio (R1/R2), it was hard to wind the prepreg r1 around the divided body and to wind the prepreg X1 (the prepreg for the bias layer) around the first intermediate body. These caused reduction in the workability of the winding process as compared with those of other examples.

The invention described above is applicable to all tubular bodies including the golf club shaft. This tubular body is applicable to, for example, sporting goods such as a tennis racket, a automobile chassis, a tire wheel, a bicycle member, a wheelchair member, a building structural material, furnitures such as a desk and a chair, a handle portion of a suitcase, a fishing rod, and a cane.

The description hereinabove is merely for an illustrative example, and various modifications can be made in the scope not to depart from the principles of the present invention.

What is claimed is:

1. A manufacturing method of a tubular body having a rib provided therein, comprising the steps of:
    preparing a mandrel divided into two or more divided bodies along a longitudinal direction of the mandrel;
    winding a prepreg for a rib around at least one of the divided bodies such that a first end portion of the prepreg and a last end portion of the prepreg overlap;
    combining all the divided bodies to obtain a first intermediate body after the step of winding the prepreg for the rib;
    winding a prepreg for an outer peripheral part around an outside of the first intermediate body to obtain a second intermediate body;
    heating the second intermediate body to obtain a cured laminate; and
    extracting the mandrel from the cured laminate.

2. The manufacturing method according to claim 1, wherein the mandrel is equally divided in a circumferential direction; the number of divided bodies is even; and the divided bodies are disposed such that a divided body around which a prepreg is wound, and a divided body without a wound prepreg alternate the circumferential direction in the mandrel.

3. The manufacturing method according to claim 1, wherein a prepreg for a rib is wound around all the divided bodies.

4. The manufacturing method according to claim 1, wherein the prepreg for a rib has a longitudinal length that is shorter than the full length of the tubular body; the prepreg for a rib is wound around a portion of a length of the divided body; the rib is disposed on a portion of a length of the tubular body; and a longitudinal position of the rib can be adjusted based on the winding position of prepreg for a rib in the divided body.

5. The manufacturing method according to claim 1, wherein the prepreg for a rib is wound around at least one of the divided bodies corresponding to a number greater than 1.00.

6. The manufacturing method according to claim 1, wherein the divided body around which a prepreg is wound has an outer surface and a rib surface; a first end portion of the prepreg for the rib and a last end portion of the prepreg for the rib are butted to each other to form an abutment; and the abutment is located on the outer surface of the divided body.

7. The manufacturing method according to claim 1, wherein prepregs for ribs are each wound around a divided body such that a first end portion overlaps with a last end portion at an overlapping section; and the overlapping sections are substantially disposed at equal intervals in a circumferential direction.

8. The manufacturing method according to claim 1, wherein the divided body around which a prepreg for a rib is wound has an outer surface and a rib surface; the prepreg for a rib is wound such that a first end portion overlaps with a last end portion at an overlapping section; and the overlapping section is located on the outer surface of the divided body.

9. The manufacturing method according to claim 1, wherein the divided body around which a prepreg for a rib is wound has an outer surface and a rib surface; the prepreg for a rib is wound such that a first end portion overlaps with a last end portion at an overlapping section; and the overlapping section is located at a boundary between the rib surface of the divided body and the outer surface of the divided body.

10. The manufacturing method according to claim 1, wherein an angle $\theta 1$ between a direction of a fiber of the prepreg for the rib and a longitudinal direction of the tubular body is 70 degrees or greater and 110 degrees or less.

* * * * *